United States Patent
Meredith et al.

(10) Patent No.: US 9,949,230 B1
(45) Date of Patent: Apr. 17, 2018

(54) BASE STATION IDENTIFICATION BASED LOCATION QUALITY DATA DETERMINATION

(71) Applicant: AT&T INTELLECTUAL PROPERTY I, L.P., Atlanta, GA (US)

(72) Inventors: Sheldon Kent Meredith, Roswell, GA (US); William Cottrill, Canton, GA (US); Rick Tipton, Corryton, TN (US)

(73) Assignee: AT&T INTECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/372,316

(22) Filed: Dec. 7, 2016

(51) Int. Cl.
*H04W 24/00* (2009.01)
*H04W 64/00* (2009.01)
(Continued)

(52) U.S. Cl.
CPC ........... *H04W 64/006* (2013.01); *G01S 5/021* (2013.01); *G01S 5/0252* (2013.01); *H04W 48/12* (2013.01)

(58) Field of Classification Search
CPC ....... H04W 64/00; H04W 48/12; H04W 4/02; H04W 24/02; H04W 84/18;
(Continued)

(56) References Cited

U.S. PATENT DOCUMENTS

| | | | |
|---|---|---|---|
| 6,847,815 | B1 | 1/2005 | Graf et al. |
| 7,047,021 | B2 | 5/2006 | Ohto et al. |

(Continued)

FOREIGN PATENT DOCUMENTS

| | | |
|---|---|---|
| DE | 102007008196 B4 | 5/2012 |
| KR | 101400138 B1 | 5/2014 |

(Continued)

OTHER PUBLICATIONS

Anagnostopoulos et al. "Efficient location prediction in mobile cellular networks." International Journal of Wireless Information Networks 19.2 (2012): 97111. [https://www.researchgate.net/publication/257573019_Efficient_Location_Prediction_in_Mobile_Cellular_Networks]. Retrieved on Sep. 29, 2016, 16 pages.

(Continued)

*Primary Examiner* — Fred Casca
(74) *Attorney, Agent, or Firm* — Amin, Turocy & Watson, LLP

(57) ABSTRACT

Determining a location quality based on base station identification is disclosed. The location quality can be based on an error attributed to a location determined based on historical data related to an identified base station. Application of supplemental data to the historical base station data can improve location quality by reducing the error. Supplemental data can comprise Voronoi data, geographic data, historical UE density data, historical UE timing advance data, or combinations thereof. Voronoi data can be associated with an area less than a service area of the base station. Geographic data can indicate areas where UEs are not likely to be located. UE density data can indicate probably UE locations. Timing advance data can indicate annular regions where a UE should be located. As such, the supplemental data can constrain a location determined for a UE and correspondingly can reduce error associated with the location.

20 Claims, 11 Drawing Sheets

(51) Int. Cl.
*G01S 5/02* (2010.01)
*H04W 48/12* (2009.01)

(58) Field of Classification Search
CPC ........... H04W 72/0486; H04W 88/085; H04W 4/025; H04W 88/02; H04W 12/02; H04W 4/008; H04L 5/0048; H04L 5/0032; H04L 63/30; G06Q 10/06313
USPC ........... 455/423, 456.1, 296, 418, 41.2, 425, 455/426.1, 432.1, 434, 515; 340/8.1
See application file for complete search history.

(56) References Cited

U.S. PATENT DOCUMENTS

| | | |
|---|---|---|
| 7,742,425 B2 | 6/2010 | El-damhougy |
| 8,078,116 B2 | 12/2011 | Houllier et al. |
| 8,219,116 B1 | 7/2012 | Ji et al. |
| 8,433,327 B2 | 4/2013 | Kumar et al. |
| 8,559,976 B2 | 10/2013 | Miyake et al. |
| 8,787,171 B2 | 7/2014 | Macnaughtan et al. |
| 8,880,081 B2 | 11/2014 | Kolavennu et al. |
| 8,994,591 B2 | 3/2015 | Dupray et al. |
| 9,113,291 B2 | 8/2015 | Venkatraman et al. |
| 9,198,154 B2 | 11/2015 | Ledlie et al. |
| 9,277,410 B2 | 3/2016 | Rodriguez et al. |
| 9,395,189 B2 | 7/2016 | Sridhara et al. |
| 9,402,188 B2 | 7/2016 | Sofman et al. |
| 9,414,196 B2 | 8/2016 | Youssef et al. |
| 9,426,044 B2 | 8/2016 | Gloss et al. |
| 2012/0150490 A1 | 6/2012 | Oyabu et al. |
| 2013/0337834 A1* | 12/2013 | Alpert ................ H04W 4/008 455/456.1 |
| 2014/0011513 A1 | 1/2014 | Watts et al. |
| 2014/0370920 A1 | 12/2014 | Caillette et al. |
| 2015/0018005 A1 | 1/2015 | Scarr et al. |
| 2015/0148059 A1 | 5/2015 | Puthenpura et al. |
| 2015/0248450 A1 | 9/2015 | Akdogan et al. |
| 2015/0312719 A1* | 10/2015 | Cho .................... H04W 4/027 455/456.5 |
| 2016/0191094 A1* | 6/2016 | Collet ................ H04B 1/3816 455/456.1 |

FOREIGN PATENT DOCUMENTS

| | | |
|---|---|---|
| WO | 2014047824 A1 | 4/2014 |
| WO | 2014203002 A1 | 12/2014 |
| WO | 2016079656 A1 | 5/2016 |

OTHER PUBLICATIONS

Park et al. "Growing an organic indoor location system." Proceedings of the 8th international conference on Mobile systems, applications, and services, ACM, 2010. [http://dspace.mit.edu/openaccessdisseminate/1721.1/62233]. Retrieved on Sep. 29, 2016, 14 pages.

Koppanyi et al. "Tracking vehicle in gsm network to support intelligent transportation systems." Int. Arch. Photogramm. Remote Sens. Spatial Inf, Sci 39 (2012): B2. [http://www0.cs.ucl.ac.uk/staff/a.beeharee/papers/isprsarchivesXXXIXB21392012.pdf]. Retrieved on Sep. 29, 2016, 7 pages.

* cited by examiner

BASE STATION IDENTIFICATION BASED LOCATION QUALITY DATA DETERMINATION

TECHNICAL FIELD

The disclosed subject matter relates to determining location quality data for location information based on an identification of a base station or an identification of a sector of a base station.

BACKGROUND

Location data quality can be associated with an amount of error attributed to a determined location. Generally, the lower the error associated with the location data, the higher the location data quality is considered. Higher quality location data can generally be considered more valuable by prospective consumers of location data. In an aspect, lower error for determined location data can allow the location data to be employed in technologies that can rely on a certain level of location data accuracy. While some location determination technologies can have better location data quality than other location determination technologies, often the more accurate location determination technologies, such as global positioning system (GPS), etc., can be considered power hungry technology, e.g., they can have a notable impact on operation times for battery-powered devices, such as smartphones, tablet computers, laptop computers, etc. In contrast, often less accurate, e.g., lower quality, conventionally determined location data, can be associated with more battery friendly location determination technology.

DETAILED DESCRIPTION

Figure 1:
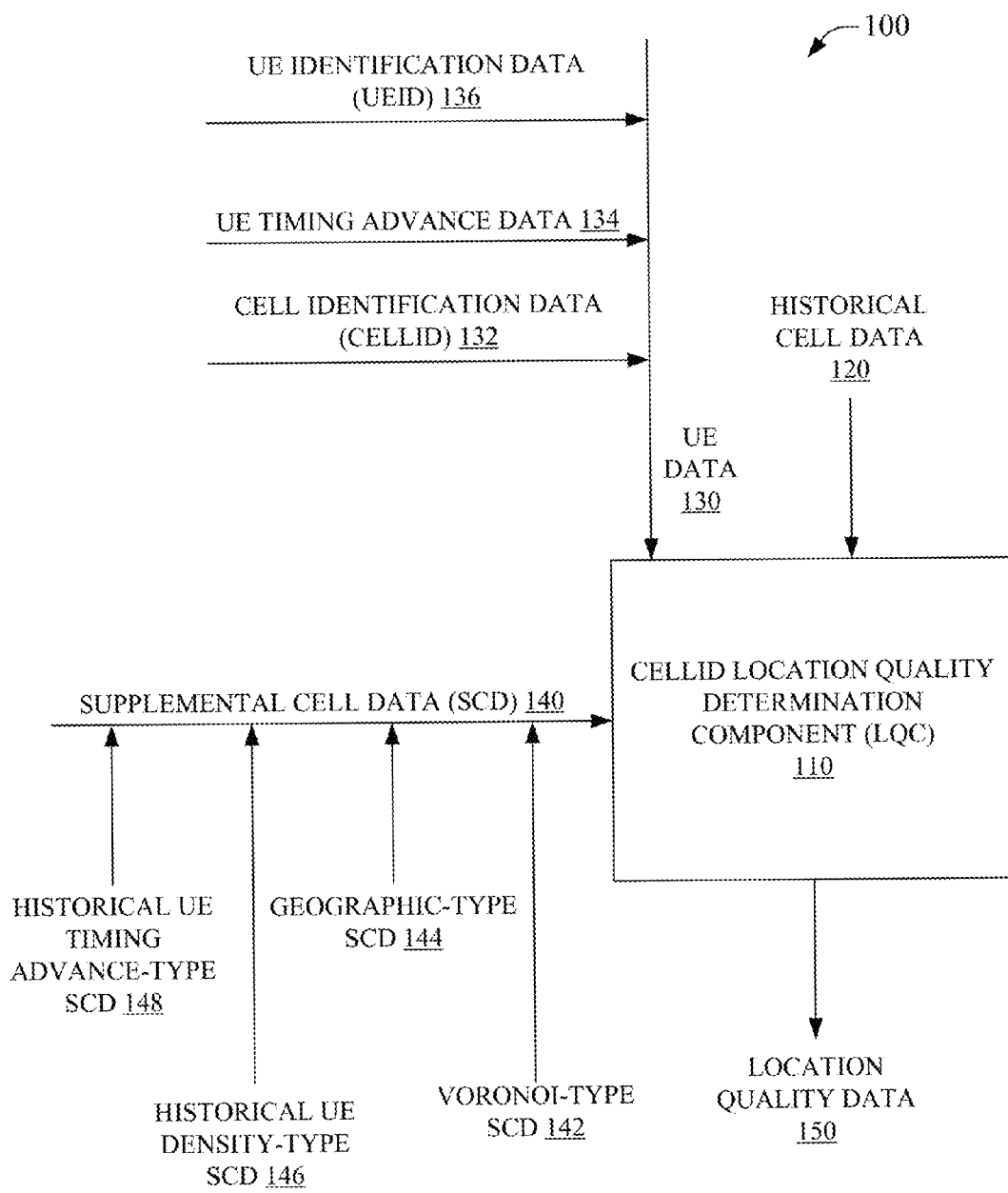
FIG. 1 is an illustration of an example system that can enable determining location quality data based on identification of a base station device in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Some location technologies can provide location information with location quality data for a user equipment (UE). Location quality data can comprise an amount of error determined to be associated with the provided location information. As an example, global positioning system (GPS) location information can be subject to an amount of error correlated to a number of visible satellites in a satellite constellation employed by a device determining a GPS location and, as such, based on the number of satellites in the constellation, location quality data, e.g., error associated with correspondingly determined GPS location information, can be provided based on the number of satellites. Moreover, modern UEs can be connected to a wireless network, e.g., via a base station (BS), and the locations of the UEs can generally be associated with the location of the BS. However, BS location information can be employed as a UE location without location quality data or, only marginally better, BS location information can be used as a UE location with the error given as the diameter of the coverage area for an omnidirectional BS or a length of a lobe for a BS having one or more sectors. Where a BS has a small coverage area, e.g., in parts of San Francisco some BS coverage areas can be about 500 meters in diameter, the location quality data can indicate a higher level of accuracy that, for example, a BS with a large coverage area, e.g., in rural Montana where a BS coverage area can be several kilometers in diameter. It is often desirable that location quality data be available such that an accuracy of the location information can be considered when the location information is consumed. The more accurate the location, often, the more valued the location information can be considered. As such, it can be desirable to improve determinations of location quality data, e.g., the more accurately error in the location information can be determined, the better the location quality data can be in representing an accuracy of the location information itself.

Some location technologies generally provide location information for user equipment (UE) in wireless network service areas. The location information can be, where available, associated with location quality data (LQD) as a metric allowing consumers of the location data to gauge how useful the location data is for a particular purpose. Location quality data can comprise an indicated amount of error determined to be associated with the provided location information. As an example, location data can be employed in conjunction with point of sale (POS) technology, whereby a location of a UE can be checked against a POS to aid in verifying that the transaction is legitimate, e.g., where a UE associated with a user's credit card is located proximate to a POS where the credit card is being used, it can be more likely to be a valid transaction while, in contrast, if the UE is located far from the POS, the transaction can be questioned as invalid. As another example, an amount of error, e.g., the quality of the location data, can be considered important in an emergency call, e.g., 911 call. Where the location quality data indicates that the UE is within several tens of meters of the reported UE location at the time of the 911 call, the responder can have a higher confidence that they will be able to locate the distressed party in comparison to the location quality data indicating that the UE is within several kilometers of the reported location of the UE.

Modern UEs can be connected to a wireless network, e.g., via a base station (BS), and the locations of the UEs can generally be associated with the location of the BS. Further, BS location information can be substituted for a UE location where other forms of determining UE location information are either not available or are less favored, e.g., high power consumption on battery powered devices, intermittent interruptions of location determination process by the other techniques, etc. Generally, substitution of a BS location for the UE location in conventional systems is provided without location quality data, or even where location quality data for the BS substitution is available, conventionally provided location quality data can often be only as accurate as a diameter of a coverage area for an omnidirectional BS, or a metric of a sector/lobe for a BS having one or more sectors. In conventional systems, a BS that has a small coverage area, for example 300 meters, where location quality data is even available, can indicate a higher level of accuracy than a BS with a large coverage area, for example 10 kilometers. Where it is typically desirable that location quality data be available and that the location quality data be more accurate than just reporting a size of a coverage area for a particular BS, such that an accuracy of the location information is improved over simply reporting that a UE is located somewhere in the coverage area of a BS, the herein disclosed techniques can provide for determining location quality data based on supplemental call data for an identified BS. Further, where more accurate location information, e.g., less reported error in the location, can often be more valuable location information, the disclosed location quality data determination technology can be associated with a higher profit margin where location quality data is commoditized.

In an aspect, LQD can be associated with cell identification data (CellID). CellID can comprise identifying information for a BS. As used herein, the term BS can refer to a cellular base station, e.g., NodeB, eNodeB, etc., to an access point (AP), e.g., femtocell, picocell, Wi-Fi AP, etc., or nearly any other device comprising a radio adapted for wireless communication with a UE. A location can be associated with the BS, e.g., the BS can be installed at a determined location, a location can be reported for a BS, a location can be determined for a BS via a variety of location determination techniques etc. Where a location determined for the BS, said location can be substituted for a UE that is within the service area of the BS based on the premise that where the UE is close enough to 'see' the BS, the location of the UE is proximate enough to be considered the same as the BS location in the absence of other more accurate UE location information. As an example, where a UE is coupled to a NodeB in an urban environment and the UE lacks other more accurate location determination technology, the location of the NodeB can be used as the location of the UE. In this example, where the NodeB, for example, can have a service area of perhaps 1 kilometer in diameter, e.g., the extents of the service area can be 500 meters away from the NodeB located in the center of the service are, and the location of the UE can be presumed to be located at the location reported for the NodeB+/−500 meters. In contrast, for example in highly rural areas, a BS can have a service area that can be much larger, such as 10 km, whereby the location of the UE can be reported as the location of the BS+/−5 km. However, supplemental cell data can be employed to improve the reported LQD.

In an embodiment, Voronoi techniques can be used to determine a Voronoi boundary around a BS, e.g., based on the location of other BSs. The Voronoi boundary can be different from the extents of the BS service area, wherein the Voronoi edge is a mathematical determination of all points closer to the BS than to any other BS. As an example, a Voronoi edge will typically bisect the straight-line distance between two BSs regardless of the coverage area of the BSs. However, where BSs are typically located such that the corresponding service areas have some overlap so as to avoid dead zones, e.g., areas of no service coverage, the Voronoi edge can actually be closer to both BSs than the extents of a service area corresponding to each BS of the BSs. Further, statistically, a UE can be anywhere in the service area of the BS, however, where a Voronoi boundary is substituted for the extents of the BS, and where in well covered network service areas the Voronoi boundaries can correspond to smaller cells than those associated with the extents of the coverage areas BSs comprising the network, the substituted Voronoi boundary can already provide an improved LQD where there can be a smaller Voronoi cell area than service area cell for the same BS. Further, statistically, a UE can be assumed to be 50% likely to be within an area comprising the closest 50% of the Voronoi cell to the BS and 50% likely to be within an area comprising the furthest 50% of the Voronoi cell from the BS, e.g., given a unit circle, 50% of the area of the circle closest to the center of the circle is geometrically circumscribed by a radius 0.707 units from the center of the circle, while the remaining 50% of the area is geometrically comprised in the band from 0.707 to 1.0 units from the center of the circle. Moreover, the distance from the BS location to the edge of the Voronoi cell can be determined, either continuously or at increments, such as at 0, 10, 20, 30 . . . 350-degrees (every 10 degrees), etc., then averaged, which can provide an average distance between the BS and the Voronoi boundary. The average distance can then be multiplied by 0.707 to determine the 50% distance, e.g., the distance at which 50% of the area is inside the distance and 50% is outside the distance. This 50% distance can then be used as LQD, indicating that a UE is 50% likely to be inside the distance and 50% likely to be outside the distance, see for example FIG. 3. As such, the BS location can be substituted for the UE location and a LQD of the 50% distance to the average Voronoi boundary can be reported, which can be an improvement over conventional techniques that report eh same location and either no LQD or an LQD that is frequently a full radius of the extents of the coverage area.

In another aspect, geographic-type SCD can be employed to improve LQD. In view of UEs generally being excluded from certain areas within a coverage area of a BS or a Voronoi cell corresponding to the BS, these excluded areas can be removed from the possible locations of the UE to improve the LQD. As an example, where 30% of a BS coverage area encompasses a lake, cemetery, extremely steep terrain, garbage dumps, etc., it can be assumed that the likelihood of a UE being located in that 30% can be low, e.g., low enough that the area should be excluded from consideration for a likely location of a UE. As such, the geographic-type SCD can be employed to map out exclusion zones where a UE will not be, e.g., even though a UE could be in the exclusion zone, there is such low probability of the UE actually being in an exclusion zone that the area of the exclusion zone is simply not considered as having a UE therein. Removal of an exclusion zone area from consideration can allow the coverage area and/or the Voronoi cell area that supports UEs to be smaller, which is associated with reporting more accurate LQD. As an example, where a Voronoi cell for a BS includes a lake, and the exclusion of the lake area reduces the area of the Voronoi cell by 30%, the average Voronoi distance, e.g., where the Voronoi cell boundary is now further bounded by the edge of the lake, can be reduced, which in turn can reduce the 50% distance and the LQD. Of note, where the extents of the coverage area, e.g., rather than the Voronoi cell, can also be reduced, the LQD can similarly be better where the lake area is excluded as compared to the full extents of the coverage area.

In a further aspect, historical UE density-type SCD can be employed to improve LQD. Historical UE density data can indicate a count of UEs in a particular location, e.g., typically more granular locations than a coverage area of a BS. As an example, a geographic area can be overlaid with a 100 meter by 100 meter grid pattern and the UE count within each 100 m×100 m grid cell can be determined, e.g., typically by other location determination technologies such as GPS, etc. Over time, the count data of the example grid pattern can illustrate UE density for the region in each grid cell. In some embodiments, the historical UE density can be represented by a heat-map image, see historical UE density-type SCD 246, etc. The historical UE density can further be correlated to a serving BS based on which BS a UE reports when the location of the UE is reported for inclusion in the density data. As such, UE density for an area associated with a particular BS can be determined and, where for example, UEs are reported at the edge of the service area for the BS, the extents of a BS coverage area can be determined over time. Interestingly, excluded areas, such as the lake example above, can also become evident in historical UE density data, namely, there can be an exceeding low count of UEs in excluded areas, or conversely, an excluded area can be defined by a threshold count of UEs. As an example, historical UE density in Cleveland can have a substantial historical UE count in areas of the city and dramatically lower counts of UEs in Lake Erie. As such, a threshold value can be selected such that Lake Erie is treated as an exclusion zone. Accordingly, for a BS along the shores of Lake Erie in Cleveland, a portion of the coverage area can be excluded as a location for a UE. Similarly, a Voronoi cell can also exclude the lake area. Moreover, a boundary based on historical UE density for a BS can also exclude the lake. As such, A historical UE density based boundary can be determined for a BS, such that the 50% of average distance between the BS and the boundary can be determined and used in reporting LQD. Similar logic applies to reporting LQD based on service area extents excluding the lake, or to a Voronoi cell boundary excluding the lake.

Moreover, historical UE density-type SCD can enable determining of a centroid or a weighted centroid for an area including a service area of a BS. As stated above, historical UE density data can generally indicate an area of service coverage for a BS, e.g., UEs typically only report a BS when they can see the BS at their reported location. As such, shape can be determined from the historical UE density data that relates to a measured service area of the BS. A geometric centroid can be determined from the shape. This geometric centroid can be substituted for a reported UE location rather than substituting a known location of the associated BS, e.g., a UE is more likely to be in the center of the shape relating to the coverage area of the BS than at the location of the BS itself. Furthermore, the LQD can then be determined based on the distance between the geometric centroid and the historical locations of the UEs from the historical UE density data, e.g., LQD can indicate that the error in the reported location of a UE is the average distance between the geometric centroid and the historically reported UE locations, which can automatically include exclusion zones via below threshold counts of UEs in areas of the historical UE density data corresponding to an exclusion zone.

In some embodiments, a Voronoi cell can be used to select historical UE density data, e.g., only historical UE density data within a Voronoi cell for a BS is considered, rather than determining a shape for based on all reported historical UE density data for the BS. As such, the geometric centroid can be determined for the Voronoi cell area via the historical UE density data. Alternatively, a centroid for the Voronoi cell shape can be directly determined. However, in view of a weighted centroid computation, use of historical UE density data to determine a shape of selecting a shape encompassed by a Voronoi cell for a BS can provide a different centroid location. A weighted centroid can consider not only the shape, but also the count of UEs in portions of the shape. As such, situations where UEs are not evenly distributed across a service area, the Voronoi cell of the corresponding BS, or represented in historical UE density data, the centroid can be shifted closer to denser populations and farther from less dense populations of UEs. The weighted centroid can be understood to reflect a higher likelihood of a UE being located where there is a higher historical density of UEs than where there is a lower historical density of UEs. As an example, where historical UE density data indicates that a shopping mall has a higher UE density than a park across the street from the shopping mall, a query as to a UE location can reflect that the UE is more likely to be at the mall than in the park. Accordingly, a weighted centroid based on the historical UE density data can be determined. The LQD can then be based on an average distance between each historical UE location and the weighted centroid. As before in the geometric centroid, a Voronoi cell can be employed to select which UEs are to be considered in determining the weighted centroid and corresponding LQD. Similarly, a BS service area can be employed to select the UEs considered in determining the weighted centroid and corresponding LQD. Moreover, a shape representing the BS service area can be determined from the historical UE density data and this shape can be employed in selecting which UEs are used in determining the weighted centroid and corresponding LQD.

In a further aspect, historical UE timing advance-type SCD can be employed to improve LQD. Timing advance (TA) data is well understood to generally reflect a distance between a UE and a service BS and is employed in correcting timing of radio interactions to account for the time that it takes for radio waves to propagate over the distance between the UE and the BS. TA data can be used to determine an annular area, or portion thereof corresponding to a sector of the BS, in which the UE is located to a serving BS. This annular region is typically one unit of TA in width, e.g., for global system for mobile communications (GSM) cellular service, a unit of TA is about 550 meters deep or the distance traveled by a radio wave in about 3.69 microseconds. In an omnidirectional BS, this TA ring typically extends 360 degrees around the BS. In a sectorized BS, for example where each of three sectors spans 120 degrees, the TA ring can divided into three arcs of 120 degree width and one TA unit deep, which can be referred to herein as a TA banana, it being noted that a TA banana can have other widths and/or depths without departing from the scope of the present disclosure. In an aspect, where a TA is known, the region of the UE is accordingly constrained. As such, historical UE TA-type SCD can enable determining a restricted area corresponding to the historical TA. This can be employed several ways. In an aspect, the historical TA information can be used to determine a restricted area corresponding to a TA value for an identified BS, alone or in combination with historical UE density data, geographic data, Voronoi data, etc. These determinations can be stored, such that in response to a query identifying a BS and a TA, a location in the restricted area can be associated with an error constrained by the extents of the restricted area, e.g., resulting from the TA banana, exclusion zones form geographic data or implied in historical UE density data, within the Voronoi cell, etc. As can be appreciated, the TA data can serve to further reduce possible locations for a UE and as such, the LQD can improve.

In an aspect, any combination of Voronoi-type SCD, geographical-type SCD, historical UE density-type SCD, historical UE timing advance-type SCD, etc., can be employed to reduce areas where a UE is likely to be located and, accordingly, a reported location for a UE can be reported with an improved LQD where the several types of SCD are employed to reduce the possible area in which the UE can be located, e.g., the error of associated with a reported location for a UE is typically lower where the area that the UE can be in is smaller. It can be observed that not all situations result in more accurate location information, however this is not dispositive of the general benefit of the disclosed subject matter. As an example, where a lake is treated as an excluded zone due to a determined threshold value, a report of a location of a UE that is actually in a boat on the lake can be worse than if the lake was not excluded via geographic-type SCD, Voronoi-type SCD, historical UE density-type SCD, or combinations thereof, e.g., exclusion of the lake can shift the reported location, such as via a weighted centroid, and can reduce the reported error value by not including the lake area, where the example UE is actually located, from LQD calculations. However, the use of SCD to improve LQD determination for an identified BS will typically improve LQD values where corresponding parameters are reasonably selected, e.g., threshold values for exclusion zones, depth of historical UE density data to prevent homogeneity in an area, shape determination parameters for determining a shape based on historical UE density data, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate determining location quality data based on identification of a base station device in accordance with aspects of the subject disclosure. System 100 can comprise CellID location quality determination component (LQC) 110. LQC 110 can receive historical cell data 120. Historical cell data 120 can comprise known locations of a base station (BS) and an identifier for that BS, e.g., a corresponding CellID. This information can be based on installation records of BSs, empirical measurements of a radio network, user reported location and CellID information, etc. Historical cell data can be received about a network from data stored by an entity associated with the network. As an example, a wireless network provider can, in the course of regular business, store data related to the identification, location, operations, and various parameters of BSs providing wireless access to the network, which information can be comprised in historical cell data 120 that can be received by LQC 110.

In an aspect, historical cell data 120 can be employed by LQC 110 to determine location quality data (LQD) 150. LQD 150 can comprise a quality metric value associated with a location of a UE based on a location of an identified BS. LQC 110 can receive UE data 130. UE data 130 can comprise CellID 132. CellID 132 can identify a BS. As an example, where a mobile device, e.g., a UE, is within a coverage area of an access point (AP), the UE can send UE data 130 comprising CellID 132, which identifies the AP, to LQC 110. LQC 110 can then determine based on historical cell data 120, a location of the AP identified by CellID 132, e.g., CellID 132 can correspond to a CellID of historical cell data 120 to facilitate access to historical data corresponding to the identified AP. Historical cell data 120 can comprise the location of the identified AP and a type of the identified AP enabling a determination of the coverage area of the identified AP, e.g., LQC 110 can determine that the identified AP is a Wi-Fi AP located at the corner of $5^{th}$ Ave. and Main St. with an omnidirectional coverage area approximated by a 150 foot diameter circle. LQD 150 can then be provided indicating that the location is associated with a +/−75 foot radius of the location of the AP. In some embodiments, LQD 150 can further provide the location, e.g., that the identified AP is located at the corner of $5^{th}$ Ave. and Main St. +/−75 feet (given in longitude/latitude, or any other convenient location format). In an aspect, a 50% error rate can be associated with a uniform distribution of UEs within the service area of an identified BS. As such, the root mean square radial measurements from the location of the BS to the edges of the service coverage area can indicate a distance at which half of the UEs are within the distance to the BS and the other half of the UEs are between the distance and the edge of the UE. The radial distance between the BS location and the edge of the service are can then be averaged for each radial measurement taken, mathematically can be performed as a summation, or as a integration of all radial measurements, e.g., a continuous sweep the RMS distances between the BS location and the extents of the service area. As an example, where measurements are taken at 0, 90, 180, and 270 degrees, the mean error estimate for the identified BS can be computed as the average of (0.707(distance between the BS location and the service edge at 0 degrees), 0.707(distance between the BS location and the service edge at 90 degrees), 0.707(distance between the BS location and the service edge at 180 degrees), and 0.707(distance between the BS location and the service edge at 270 degrees)). The mean error estimation can improve where more RMS distances are taken, e.g., taken every 10 degrees can be better than every 90 degrees, every one degree can be better than every 10 degrees, the RMS of the integral of the distanced between the BS location and the service edge from 0 to 360 degrees being better than every one degree.

In an embodiment, LQC 110 can improve the error measurement comprised in LQD 150 by employing supplemental cell data (SCD) 140 in determining LQD 150. SCD 140 can comprise any combination of Voronoi-type SCD 142, geographic-type SCD 144, historical UE density-type SCD 146, historical UE timing advance-type SCD 148, etc. SCD 140 can be employed by LQC 110 to ignore areas where a UE is less likely to be located, such that the area where the UE can be located and concurrently in the service area of an identified BS is reduced, allow a greater degree of confidence in the reported location, e.g., a higher quality of location data that can be associated with a lower degree of error in comparison to returning a location of a device with error bounded solely by the claimed service area of the identified BS.

Voronoi-type SCD 142 can comprise Voronoi data related to a BS. In an aspect, historical cell data 120 can be associated with Voronoi data, e.g., a wireless radio network can be associated with Voronoi data defining Voronoi cells for the several BSs of the wireless radio network, see Voronoi-type SCD 242, etc. A Voronoi cell can have different extents from extents of a coverage area for the same BS. This can result from BSs generally being located close enough to each other that there is often overlap in coverage areas and, whereas the Voronoi cell edges relate to distances between BSs that represent points typically midway between BSs, the Voronoi cell edges can often represent a smaller area than a service area. Voronoi-type SCD 142 therefore can be an improvement over the extents of a coverage area by reducing the area that is likely to contain a UE for an identified BS. The average of the RMS distance between the BS location and the edges of the Voronoi cell can then be used to generate an average mean error that can also be an improvement over the average RMS distance between the BS location and the extents of the BS coverage area. In some embodiments, Voronoi-type SCD can be generated by LQC 110 based on historical cell data 120 or, in some embodiments, Voronoi-type SCD 142 can be received by LQC 110 comprised in SCD 140, while in some embodiments, Voronoi-type SCD can be both generated by LQC 110 and received by LQC 110 via SCD 140.

In an aspect, the Voronoi cell can be employed to determine a centroid location that can be different from the location reported for the BS. This centroid location can be employed in determining LQD 150 by LQC 110. In an embodiment, LQC 110 can determine the centroid of the Voronoi cell, and can determine the average RMS distance between the centroid location and the edges of the Voronoi cell in a manner similar to that disclosed herein for determining the average of the RMS distance from the location of the BS to the edges of the Voronoi cell. This can be a further improvement of LQD 150 in that the centroid can be substituted for the UE location, rather than the location of the BS, as it represents a center of the Voronoi cell and the average of the RMS distance can therefore be smaller with the centroid than with the BS location.

Geographic-type SCD 144 can comprise geographic data corresponding to geographical aspects of an area associated with an identified BS. Geographic data can comprise topographical map information, roadway information, etc. As an example, geographic data can comprise a location of a lake, graveyard, airport, steep cliff, timber forest, etc. An example lake ca be associated with an area that a UE is unlikely to be located. As such, the area of the lake can be removed from possible areas a UE can be located within a service area of a BS or a Voronoi cell for the BS. This can reduce the error associated with substituting a location of the BS for the location of the UE thereby increasing the quality of the location data. As an example, where a lake occupies a portion of a service area, and correspondingly a portion of a Voronoi cell, for an identified BS, the extents of the lake can be removed from the computations of the average RMS distances between the BS location and the edge of the service area or the edge of the Voronoi cell, e.g., rather than using an RMS from the BS to the edge of the Voronoi cell over water, LQC 110 can use the RMS value from the BS to the edge of the lake as defined in geographic-type SCD 144. Similarly, the lake can be removed from the average RMS values determined based on the extents of the service area rather than the edges of the Voronoi cell.

In an aspect, the geographic data can be employed to determine a geographic centroid location that can be different from the location reported for the BS and/or the centroid of a Voronoi cell. This geographic centroid location can be employed in determining LQD 150 by LQC 110. In an embodiment, LQC 110 can determine the geographic centroid of the Voronoi cell sans excluded areas determined form the geographic data, and can determine the average RMS distance between the geographic centroid location and the edges of the Voronoi cell as modified by the exclusion areas. This can be a further improvement of LQD 150 in that the geographic centroid can be substituted for the UE location, rather than the location of the BS, where it represents a center of the Voronoi cell as modified by exclusion areas, and the average of the RMS distance can therefore be smaller with the geographic centroid than with the BS location or the centroid of the Voronoi cell unmodified by any exclusion area(s) derived from the geographic data.

Historical UE density-type SCD 146 can comprise historical UE density data. Historical UE density data can relate to or indicate a count of UEs in an area or 'bin'. In an aspect the 'bin' can be defined by a regular granular division of a larger area into one or more bins, e.g., 100 meter×100 meter bins. A count of UEs for each bin can correlate to UE density for the larger area. In an aspect, historical UE density data can generate a heat map showing historically dense UE locations. Whereas the UEs comprising historical UE density data can be correlated with a CellID, the historical UE density data can further indicate which BS s the UE saw at the reported location/bin. This can allow correlation between a BS and an area of service directly form historical UE density data. In an aspect, LQC 110 can determine a shape of the coverage area for a BS based on historical UE density-type SCD 146. In another aspect, LQC 110 can receive a shape of a coverage area for a BS based on historical UE density data via historical UE density-type SCD 146.

In an embodiment, historical UE density data can be employed by LQC 110 to generate LQD 150. Where a service area can be derived from historical UE density data, LQC 110 can determine an average RMS of distances between the BS location and the extents of the device area determined form the historical UE density data. In an aspect, the historical UE density data can naturally include features more commonly associated with geographic data, e.g., a lower density of UEs can be expected in the middle of lake than in the middle of a grocery store near the lake. As such, the average RMS distance measurements can be an improvement over simply reporting the extents of the BS that can, for example, ignore the lake or other low UE density areas. In an aspect, historical UE density data can be combined with geographic-type SCD 144 that can have, for example, more precise measurements of the lake edge than might be found in the historical UE density data.

Moreover, where historical UE density data comprises known locations in a service area, LQD 150 can be determined by averaging distances between the BS location and a bin for each reporting UE of the historical UE density data. As an example, where a BS has a 2000 meter diameter service area and where 10 UEs report from 400 meters away from the BS location and 1000 UEs report from 800 meters away for the BS location, the error can be ((10*400 meters)+(100*800 meters))/110)=763 meters, which illustrates an improvement over the +/−1000 meter error that would have been reported based only on the coverage area of the BS.

In an embodiment, historical UE density data can be combined with Voronoi-type SCD 142. The combination can employ the Voronoi cell to select which historical UE density data to employ, in contrast to using the historical UE density data to determine which historical UE density data is correlated to a BS. The use of the Voronoi cell to select historical UE density data can, again because it can generally be a smaller area than an extents of a service area for the BS, provide an improved error measurement in LQD 150. In some embodiments, the historical UE density-type SCD 146 can be combined with both geographic-type SCD 144 and Voronoi-type SCD 142, e.g., providing density information within a Voronoi cell and excluding a measured edge of a lake, etc.

In a further aspect, historical UE density data from historical UE density-type SCD 146, can be employed to determine a weighted centroid. The weighted centroid can shift the centroid towards higher density locations and away from lower density locations in the service area, e.g. a UE is more likely to be located at a historically dense area as compared to a historically sparse area. The historical UE density data, as disclosed above, can be employed to compute the average distance between the weighted centroid location and each of the reporting UE locations comprised in the historical UE density data. This can further improve LQD 150 in that not only can the UE location be reported as the weighted centroid, but error associated with the average distance is based on the weighted centroid to further reduce the error. In an aspect, this is a statistical manipulation that results in a majority of UE queries reporting with improved location and higher quality, at the expense of a minority of UE queries that will return a more incorrect location at decreased quality. As an example, if 98 UEs are located at A and 2 UEs are located at B, then the weighted centroid will be much closer to A than to B, correspondingly the distance between the weighted centroid and the 98 UEs at A will overpower the distance between the weighted centroid and the two UEs at B when averaged, as such, when a UE location query comes in (for the 101$^{st}$ UE), the location can be given as the weighted centroid with an error that is biased by the 98 UEs located at A. Therefore, if the 101$^{st}$ UE is actually located at A, the weighted centroid location and LQD will be much more accurate than, where the 101$^{st}$ UE is actually located at B. This can be interpreted as saying, mathematically speaking, that historically most UEs are at A, and if we have to guess at a location of the 101$^{st}$ UE, we will presume it is also most likely at A, and if it is actually at B then statistically it is an outlier.

Historical UE timing advance-type SCD 148 can comprise historical UE timing advance (TA) data. Historical UE TA data can relate to timing advance values associated with historical UE reporting for a determined BS. Generally speaking, in wireless communications, timing advance data is employed in scheduling communications between a BS and UE to account for propagation of a radio signal across a given distance. The farther a radio signal travels the longer it takes to propagate. Timing advance is typically measure in units of 'chip' where a chip represents the change in round-tip propagation distance, e.g., twice the propagation range. Each unit of chip represents can correspond to an offset time value, for example 3.7 microsecond, such that the difference of chip in timing advance represents a distance gap based on the offset time value multiplied by the value of a chip. As an example a four chip timing advance can be (4*3.7)=14.8 microseconds, while a three chip timing advance can be (3*3.7)=11.1 microseconds and the timing gap between a four chip and three chip timing advance is 3.7 microseconds. Where a radio signal propagates near the speed of light in typical wireless network operating environments, the chip value corresponds to a round-trip distance the radio signal propagates in said time. As an example, one chip can correspond to a distance of 3.7 microseconds*300 meters/microsecond=about 1100 meters round-trip, e.g., 550 meters between the UE and the BS. As such, a four chip timing advance can be at about 4400 meters (2200 meters between the UE and the BS) and a three chip timing advance can be at about 3300 meters (1650 meters between the UE and the BS). As such, a gap between devices reporting four chip and the devices reporting three chip TA values is 550 meters wide (1100 meters round-trip). This can be represented by a annular region that is 550 meters wide, starting at 1650 meters from the BS and ending at 2200 meters from the BS, e.g., a UE reporting three chip TA can be anywhere in the 550 meter wide annular region starting at 1650 meters from the BS up to 220 meters from the BS (where it would then report as a four chip TA). In a sectorized BS, the region for the UE can be further narrowed to an arc of 550 meters deep across the width of the sector, e.g., 120-degrees, etc., forming a 'banana' shape.

Historical cell data 120 can be combined with historical UE timing data, e.g., from historical UE timing advance-type SCD 148, etc., to precompute areas associated with a BS, or sector of a BS, at a given TA value. As such, when UE data 130 comprises a TA value, the TA value can be employed to look up the precomputed region that will constrain the UE location. Moreover, in some embodiments, TA rings or bananas can be computed on the fly, rather than being precomputed, such that UE TA data 134, when included in UE data 130, can be employed to determine a region for BS identified by CellID 132. Where a constraint region associated with TA data is determined, the UE is likely, if not assuredly, in the constraint region, allowing a more accurate reporting of location, e.g., a location in the constraint region and a correspondingly lower degree of error in the reported location. In an aspect, the centroid of the constraint region associated with the timing advance can be employed as the location and the error can be the mean distance between the location and the edges of the constraint region. As an example, where a TA banana is determined to be a constraint region, then the location can be reported as the centroid of the TA banana and the error can be the mean distance between the centroid location and the edges of the constraint region. In an embodiment, for an omnidirectional BS, the location of the BS can be the same as the centroid of the annular ring constraint region from TA data, the error can be improved to be the mean distance to the outer edge of the annular region. While use of TA data alone can be useful in improving LQD 150, historical UE TA data can be combined with other SCD 140 to provide further improvement.

In an aspect, historical UE TA data can be combined with Voronoi cell data. Combining the Voronoi cell area with the annular region or banana determine from TA data can further reduce possible areas in which a UE can be located. However, this is typically only useful where the UE is reporting TA that corresponds to TA constraint regions that are near, at, or beyond a Voronoi cell edge for a determined BS, e.g., a TA ring or banana near to the BS and not interacting with a Voronoi cell edge remains similar to just using historical UE TA-type SCD 148 alone.

In another aspect, historical UE TA data can be combined with geographic-type SCD 144. Where a geographic feature associated with excluding UEs interacts with a TA annular region or TA banana, this can further reduce an area where the UE can be and correspondingly reduce the error in the reported location. As an example, where a causeway crosses a large body of water and a TA banana arcs across the causeway, see FIG. 6, etc., it can be reasonable to presume that a UE will be on the road and within the banana, which region can be substantially smaller than the area associated with the entire service area of the BS, the area defined by the entire causeway within the BS service area, or the area circumscribed by the TA banana. As such, the centroid of the intersection of the causeway and the TA banana can be reported as the location of the UE and the error can be the mean distance from the centroid to the extents of the intersection between the causeway and the TA banana.

In a further aspect, historical UE TA data can be combined with historical UE density-type SCD 146. Historically dense areas of UE population in a region of a TA annular area or TA banana can improve LQD 150. Where a TA annular region overlaps a shopping mall in one area while the rest of the annual region overlaps forest or fields can suggest that a UE is more likely to be in the shopping mall area than in the forest or fields. As such, a union of a shape defined by the historical UE density can be employed to determine a centroid of the area of the union, or in some embodiments a weighted centroid of the area of the union to yield a location of the UE and corresponding error measured, for example, as the average distance between the centroid and the extents of the area of the union or the locations of the reporting UEs in the historical data, from the weighted centroid to the extents of the area of the union or the locations of the reporting UEs in the historical data, etc.

In some embodiments, the presently disclosed subject matter can enable combining one or more of Voronoi-type SCD 142, geographic-type SCD 144, historical UE density-type SCD 146, historical UE TA-type SCD 148, etc., to reduce possible areas in which a UE is likely to be located, such that an improved location can be reported and a correspondingly improved LQD 150 can be reported, e.g., a lower error inherent in the location provided. As an example, historical UE density data can indicate a strip of freeway that has high UE densities, which can be combined with geographic data to better define the edges of the freeway, which can be combined with a Voronoi cell edge to reduce the amount of freeway considered as a probable location for a UE, which can be combined with a TA value that corresponds to a TA banana crossing the freeway. This example combination can result in, for example, a 550-meter long stretch of the freeway as a likely location for any UE seeing the corresponding BS. Where the historical density is generally homogeneous on the stretch of freeway in the example, the geographic centroid of the freeway can be used as the location for a UE and the error, e.g., LQD 150, can be determined to be the mean distance from the centroid to the extents of the freeway as determined from the geographic data, which can be a higher quality than the conventional technique of asserting the BS location as the UE location with an error that is the diameter of the BS service area.

LQC 110 can further receive UE data 130. UE data 130 can comprise any combination of CellID 132, UE TA data 134, UEID 136, etc. UE data 130 can enable selection of corresponding historical cell data 120 by LQC 110, e.g., CellID 132 can enable LQC 110 to employ historical cell data 120 corresponding to the identified BS. Similarly, for example, UE TA data 134 can enable LQC 110 to employ historical TA rings or bananas, or calculate these on the fly, for the same TA value in historical cell data 120 for the identified BS.

Figure 2:
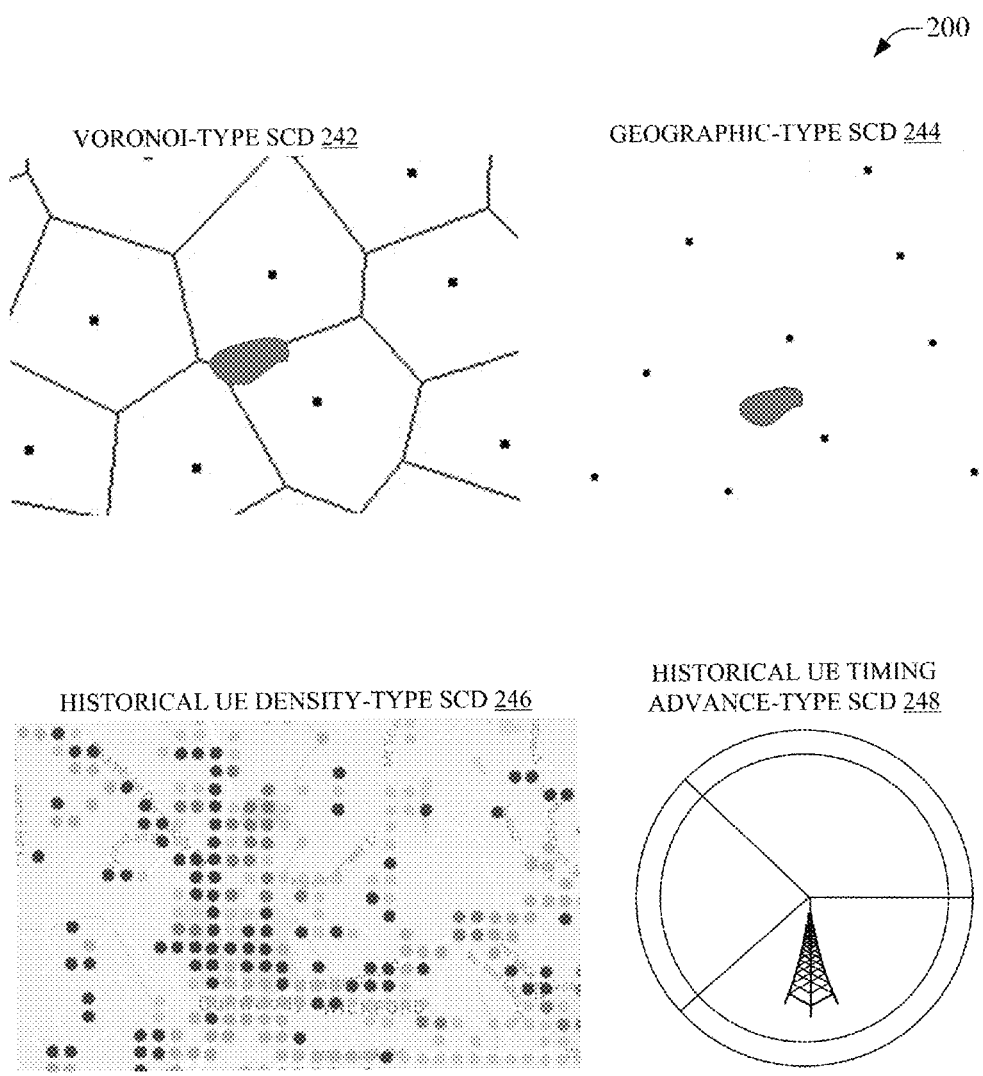
FIG. 2 is an illustration of examples of supplementary cell data that can be employed in determining location quality data based on identification of a base station device in accordance with aspects of the subject disclosure.

FIG. 2 is an illustration of examples of supplementary cell data 200 that can be employed in determining location quality data based on identification of a base station device in accordance with aspects of the subject disclosure. System 200 illustrates, at 242, an example visualization of Voronoi-type SCD, wherein each black square represents a BS and the Voronoi cell edges can be seen surrounding the illustrated BSs. Additionally, a geographic region, e.g., a lake, is illustrated. As disclosed herein above, the example lake can more typically be associated with geographic-type SCD, e.g., 244, etc., but is illustrated at 242 to show how it can alter a Voronoi cell edge, e.g., causing the affected Voronoi cell to be smaller in area. Whereas Voronoi mathematics is well documented, further discussion of determining Voronoi cells is beyond the scope of the instant disclosure other than to state that all forms of determining a Voronoi edge can be employed in determining LQD, e.g., 150, etc., as disclosed herein.

System 200 illustrates, at 244, and example visualization of geographic-type SCD. As can be seen, the black squares again represent BSs, such as those illustrated in 242. Moreover, a geographic element, e.g., a lake is also illustrated, and in an instance can correspond to the lake in 242. The lake can represent a geographic area where a UE is unlikely to be located. Determining which geographic areas are unlikely to comprise a UE is generally beyond the scope of the present disclosure, although any such determination can be employed in determining LQD, e.g., 150, as disclosed herein. As an example, all bodies of water can be determined to exclude UEs, bodies of water exceeding a determined threshold area can be determined to exclude UEs, etc. In an aspect, geographic-type SCD 244 can provide defined coordinates along edges of geographic features that can be, for example, more accurate than can be determined by other techniques, e.g., UE density mapping, etc. As such, combining geographic-type SCD 244 can improve LQD determination.

System 200 illustrates, at 246, an example visualization of historical UE density-type SCD. Historical UE density-type data can comprise historical counts of UEs in areas comprising a region, which can be seen as shaded circles overlaying a map of a region. In the illustration, darker shading indicates higher UE densities in that area of the map, such that the left side of the pictured area can generally be said to have a higher UE density than the right side of the pictured area. In an aspect, the visualization of the historical UE density data can be organized, such as in a grid pattern, as illustrated, although other organizations of UE density data are equally as usable in the disclosed subject matter. Moreover, the example visualization can indicate levels of UE density in the shading of the circles, e.g., no sharing can indicate less than a determined bottom threshold count of UEs, while the darkest shading can indicate more than a determined top threshold count of UEs, and intermittent shades can correspond to counts of UEs according to tiers of counts between the bottom threshold and the top threshold counts. In an aspect, actual UE counts can also be employed, despite illustrating levels of density in the example visualization for clarity and brevity. As an example, levels can comprise <5 UEs, 6-100 UEs, 101-500 UEs, 501-600 UEs, and >601 UEs. Other examples can include other determined thresholds for each determined level. In a further example, actual UE counts in each bin can be employed (although this is more difficult to illustrate, the data can be directly employed without conversion to a visualization of the UE density data). The historical UE density can be combined, as disclosed herein, with other SCD, e.g., 140, 242, 244, 246, etc., to improve determination of LQD, e.g., 150, etc. As an example, where SCD 246 is combined with SCD 242, the Voronoi edges can be employed to select the historical UE densities that can be employed in determining the LQD. As another example, where SCD 246 is combined with SCD 244, the lake edges can be more precisely defined than where low density areas alone (from SCD 246) are used in determining the LQD, e.g., the bin grid pattern can be more course than a geographic survey of the lake edges, which geographic survey data can be provided in SCD 244. In an aspect, although not illustrated, SCD 246 can comprise UE density correlated to one or more BSs.

System 200 illustrates, at 248, an example visualization of historical UE timing advance-type SCD. The depth of the ring, e.g., from inner edge to outer edge, can be one chip. In some embodiments, the ring depth can be other than one chip. Moreover, sectorization of the base station (the illustrated tower) can divide the ring into, for example, three banana shapes. In an aspect, the inner surface of the ring or bananas can represent a first timing advance value and the outer surface of the ring or bananas can represent a second timing advance value. In embodiments of the disclosed subject matter, SCD 248 can be combined with other SCD, e.g., 242, 244, 246, etc., to improve determining LQD, e.g., 150, etc. As an example, SCD 248 can be combined with SCD 246. In this example, a UE can be determined to be located in the left TA banana based on a reported TA value and reported BS sector, e.g., via CellID 132, etc. Moreover, the determined TA banana can overlap different historical densities of UEs as determined form SCD 246. As such, LQD can be determined based on a weighted centroid of the TA banana in view of the historical UE densities therein, such that the error is represented by an average distance between the historical reporting UE location and the weighted centroid of the TA banana, which can be an improvement over conventional technologies.

Figure 3:
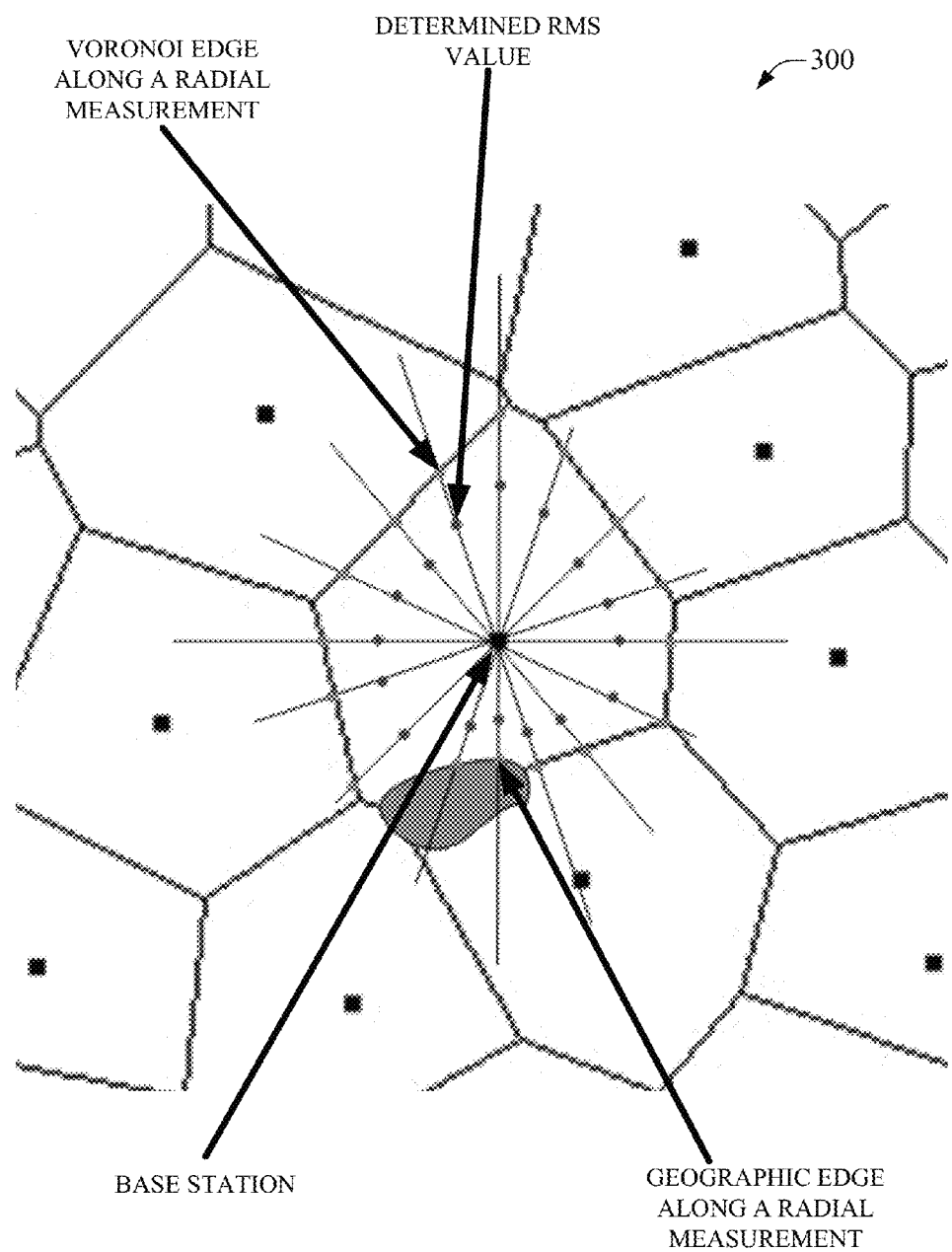
FIG. 3 is an illustration of an example of combining Voronoi-type supplementary cell data and geographic-type supplementary cell data in determining location quality data based on identification of a base station device in accordance with aspects of the subject disclosure.

FIG. 3 is an illustration of an example 300 of combining Voronoi-type supplementary cell data and geographic-type supplementary cell data in determining location quality data based on identification of a base station device, in accordance with aspects of the subject disclosure. Example 300 illustrates a Voronoi edge along a radial measurement vector from the indicated base station, e.g., each radial arm extending from the base station through the Voronoi edges can be 22.5-degrees apart, as illustrated, etc. The determined RMS value for that arm can be 0.070*the distance from the base station to the Voronoi edge, as indicated by the dark circles on each radial arm illustrated, exclusive of the arms passing through the lake. The lake, a geographical area defined as devoid of UEs, can be determined from geographic-type SCD, e.g., 144, 244, etc. The radial arms passing through the lake can therefore have a determined RMS value that can be 0.070*distance from the base station to the edge of the lake, e.g., the geographical edge along a radial measurement, rather than to the edge of the Voronoi cell passing through the lake itself. The use of the lake as a supplemental edge tot eh Voronoi cell can therefore reduce the area in which a UE can be located and can result in lower RMS values than would result from the Voronoi edge. As such, the determination of LQD can correspondingly be improved, wherein the average of the RMS values results in a lower value than would be determined based strictly on the Voronoi cell edge alone.

Figure 4:
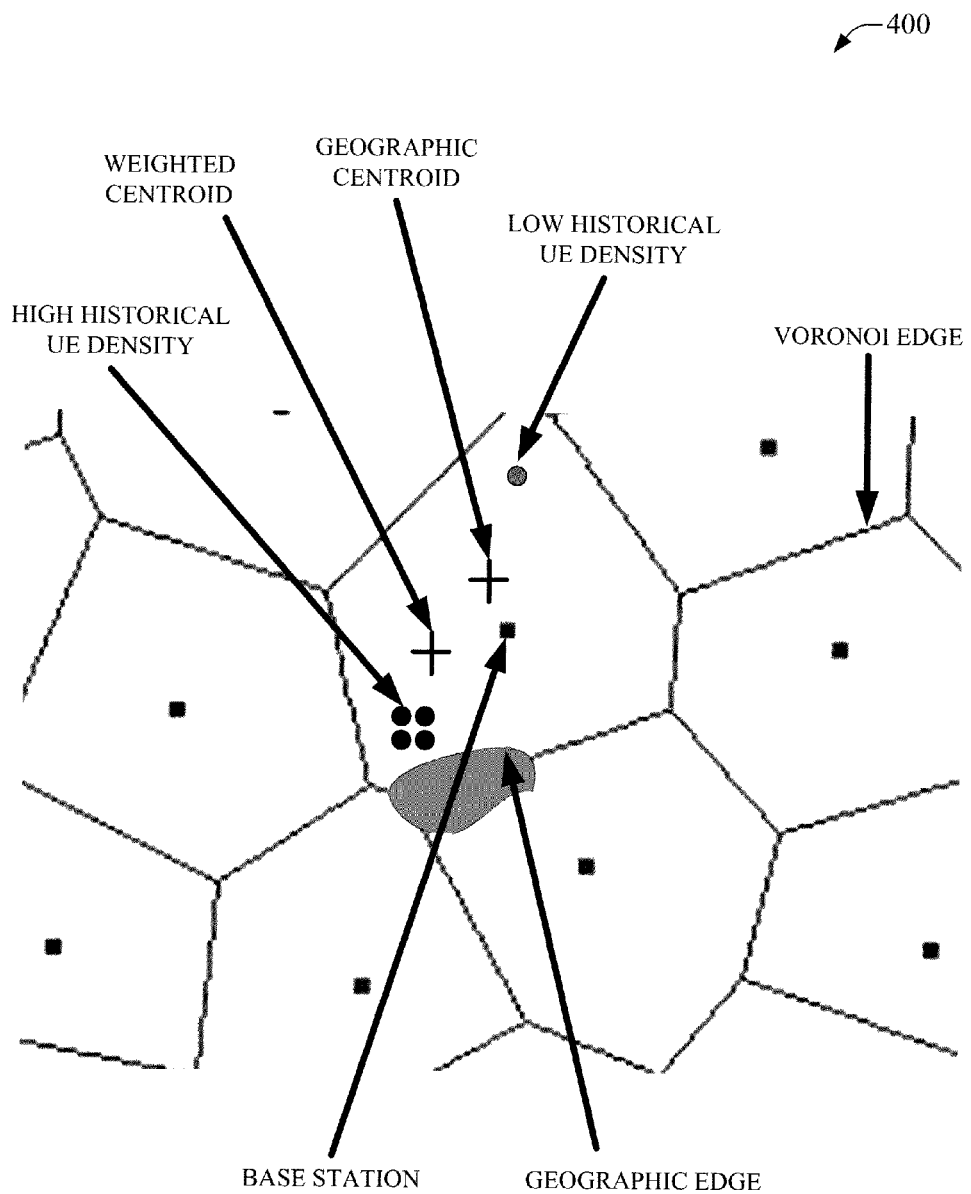
FIG. 4 is an illustration of an example of combining Voronoi-type supplementary cell data, geographic-type supplementary cell data, and historical UE density-type supplementary cell data in determining location quality data based on identification of a base station device in accordance with aspects of the subject disclosure.

FIG. 4 is an illustration of an example 400 of combining Voronoi-type supplementary cell data, geographic-type supplementary cell data, and historical UE density-type supplementary cell data in determining location quality data based on identification of a base station device in accordance with aspects of the subject disclosure. Example 400 illustrates an example Voronoi cell associated with the indicated base station. The Voronoi cell edges can be modified to include a geographic edge. The resulting shape can be employed to determine a geographic centroid. The geographic centroid can correspond to a smaller area than would be represented by either the extents of a coverage area of the BS or the extents of the Voronoi cell alone. The centroid can be at a different location than the location of the BS, and the centroid location can be substituted for a UE location. An LQD can be determined based on the average RMS distance to the edges of the Voronoi cell as modified by the geographic edge.

Moreover, where historical UE density data is available, e.g., example visualization of a four high historical UE density areas and one low historical UE density area, a weighted centroid can be determined. The weighed centroid can be substituted for the UE location rather than the geographic centroid or the BS location. Further, the LQD can be based on the average distance from the weighted centroid to the reporting UEs of the historic UE density data, which can represent a further improvement of the error associated with the location data. In an aspect, the historical UE density data can be selected based on the Voronoi cell edges, the Voronoi cell edges as modified by the geographic edge, a shape determined from the historical UE density data itself, etc. As can be observed in example 400, the weighted centroid can be located closer to the higher UE density areas than to the lower UE density areas. In some circumstances, the weighted centroid can be shifted closer to denser UE areas than the geographic centroid or the BS location. Moreover, the use of historical UE density data can result in the average distance between the weighted centroid and the reporting UEs to be less than the average RMS values from either the geographic centroid or the BS to the Voronoi edges of the Voronoi cell, either with or without modification by a geographic edge.

Figure 5:
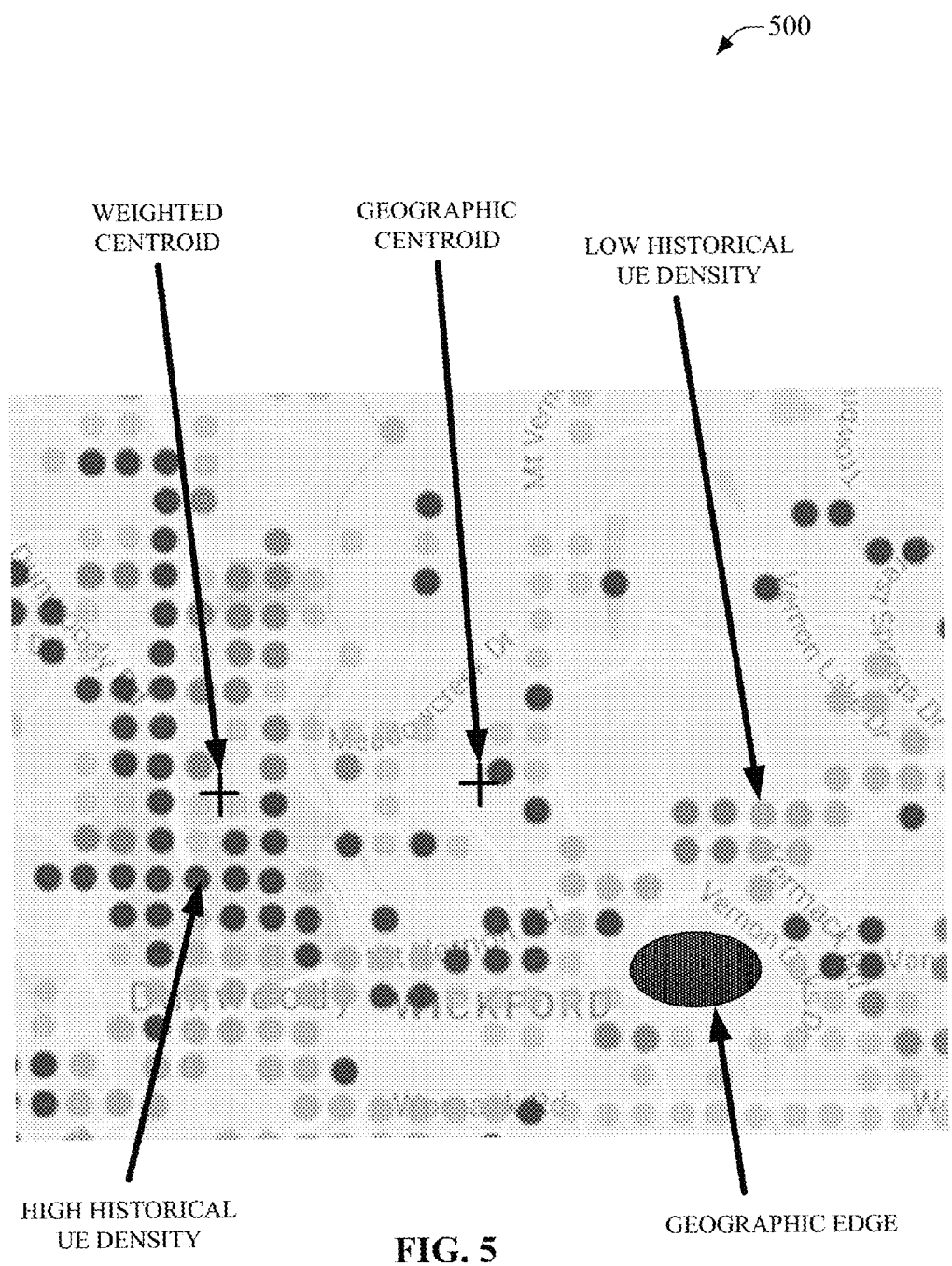
FIG. 5 illustrates an example of employing historical UE density-type supplementary cell data, with or without geographic-type supplementary cell data, in determining location quality data based on identification of a base station device in accordance with aspects of the subject disclosure.

FIG. 5 is an illustration an example 500 of employing historical UE density-type supplementary cell data, with or without geographic-type supplementary cell data, in determining location quality data based on identification of a base station device in accordance with aspects of the subject disclosure. Example 500 depicts an area inside the service area of a BS. Also illustrated is a geographic edge, e.g., associated with an area that is defined as not comprising a threshold count of UEs, such as a lake, cemetery, airport runway, etc. The geographic edge can be provided via geographic-type SCD, e.g., 144, 244, etc., or can be determined based on historical UE densities in an area being below a threshold level. Example 500 illustrates more higher-density UE bins in the left of the image than in the right of the image, which comprises more low historical UE density bins. In an aspect, a geographic centroid can be determined based on a shape (not illustrated) encompassing determined UE density bins associated with an identified BS. LQD can then be determined by the average RMS value of the distance from the geographic centroid to the edge of the shape. Moreover, a weighted centroid can determined based on the shape and the historical UE density data. This weighted centroid can be located closer to higher density bins than to lower density bins. The LQD can then be based on the average distance from the weighted centroid to each of the reporting UEs comprised in the historic UE density data for the BS and included in the shape. Whereas the weighted centroid is typically located closer to the higher density bins, the distance from the weighted centroid to the higher density bins can affect the average more than the distance to the lower density bins because there are more UEs associated with the higher density bins. As the distances for the higher density bins is also typically shorter than the distance to the lower density bins, this can reduce the average distance and correspondingly the LQD can be improved. As disclosed above, statistically a UE is more likely to be located at the higher density bins than the lower density bins, and accordingly, the location for the weighted centroid is shifted toward the higher density bins and the error is reduced where the weighted centroid is closer to more likely location of a UE.

Figure 6:
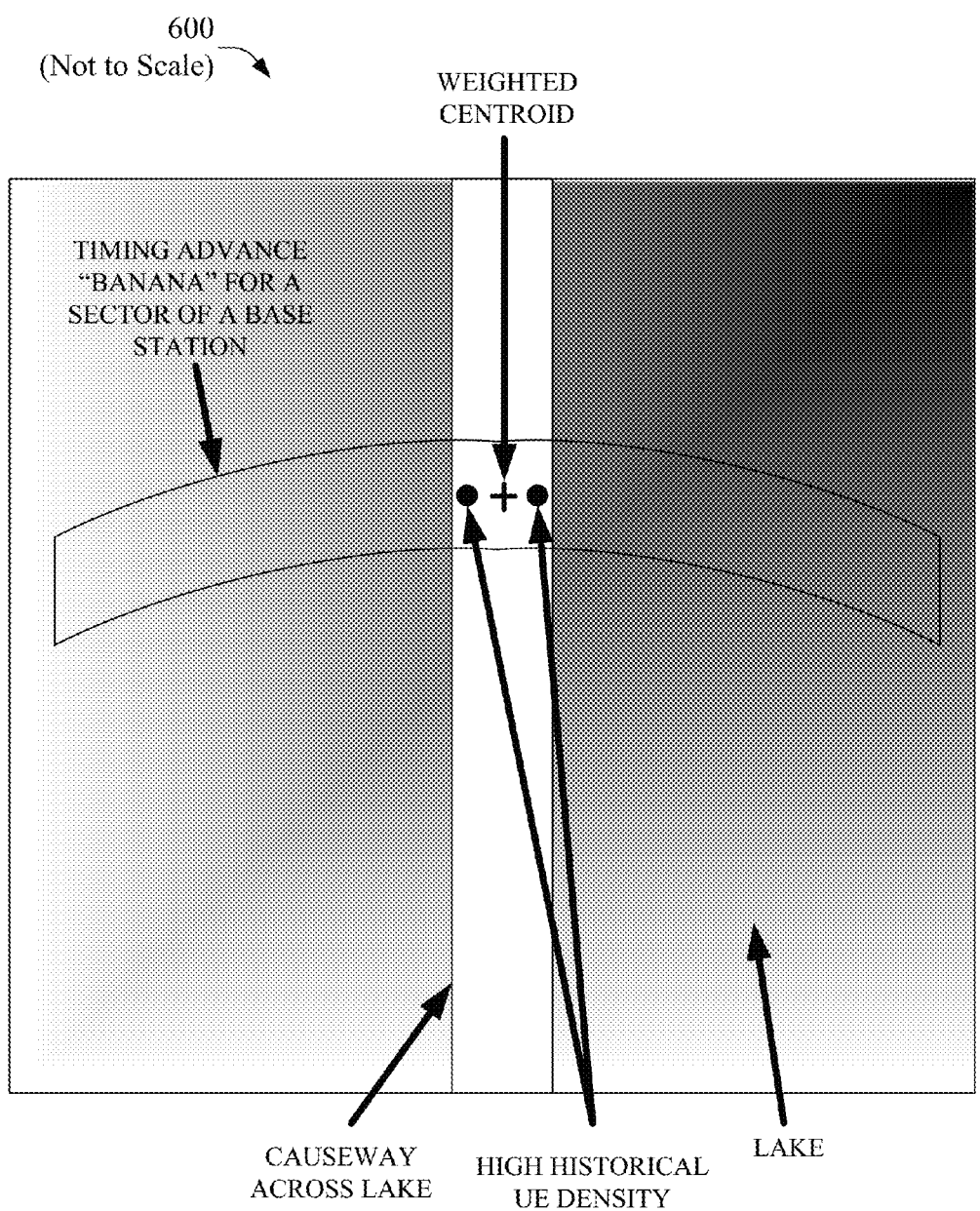
FIG. 6 illustrates an example of combining historical UE timing advance-type supplemental cell data and historical UE density-type supplementary cell data in determining location quality data based on identification of a base station device in accordance with aspects of the subject disclosure.

FIG. 6 is an illustration an example 600 of combining historical UE timing advance-type supplemental cell data and historical UE density-type supplementary cell data in determining location quality data based on identification of a base station device in accordance with aspects of the subject disclosure. Example 600 illustrates a causeway crossing a large lake. As such, it can be expected that there can be little UE presence in the water itself and where the portion of the causeway is far from land, almost all UEs can be expected to be located on the causeway itself. This can be reflected by the two high historical UE density bins on the causeway. Moreover, the weighted centroid based of the historical UE density data can be directly between the two high density bins. Moreover, a TA banana can be employed to select only the two bins that fall within the banana, e.g., from historical UE TA-type SCD, 148, 248, etc. Further, the extents of the causeway within the banana can be determined form the historical UE density data, e.g., there is no UE density in the lake above a threshold level, or can be determined form geographic-type SCD, e.g., 144, 244, etc. Where geographic-type SCD is employed, the accuracy of the causeway geometry can be better than can be determined from UE density bins. As such, based on TA data, geographic data, and UE density data, a region can be determined in which it can be expected a UE with the same reported TA value can be found. This region can be substantially smaller than a region only associated with a coverage area of a BS, a region only associated with the TA banana, a region only associated with the geographic data, or a region only based on a shape derived from UE density data, etc., can be, particularly where the BS is located far from the intersection of the TA banana and the causeway, e.g., where the BS is located at the shore edge and the banana is perhaps several kilometers from shore. As such, the weighted centroid can be substituted of the UE location. Moreover, the average distance from the weighted centroid to the reporting UEs of the historic UE density data can be short, e.g., covering perhaps one or two lanes of the causeway. As such, example 600 can provide a very low error, e.g., good LQD, for a UE. Where, for example the causeway is perhaps 25 meters wide and the banana is perhaps 500 meters deep, the location of the UE can be at the weighted centroid+/−<250 meters, which, compared to the example coverage area of the BS at +/−2 kilometers, is a substantially lower location error leading to the location at the weighted centroid being of high quality.

Figure 7:
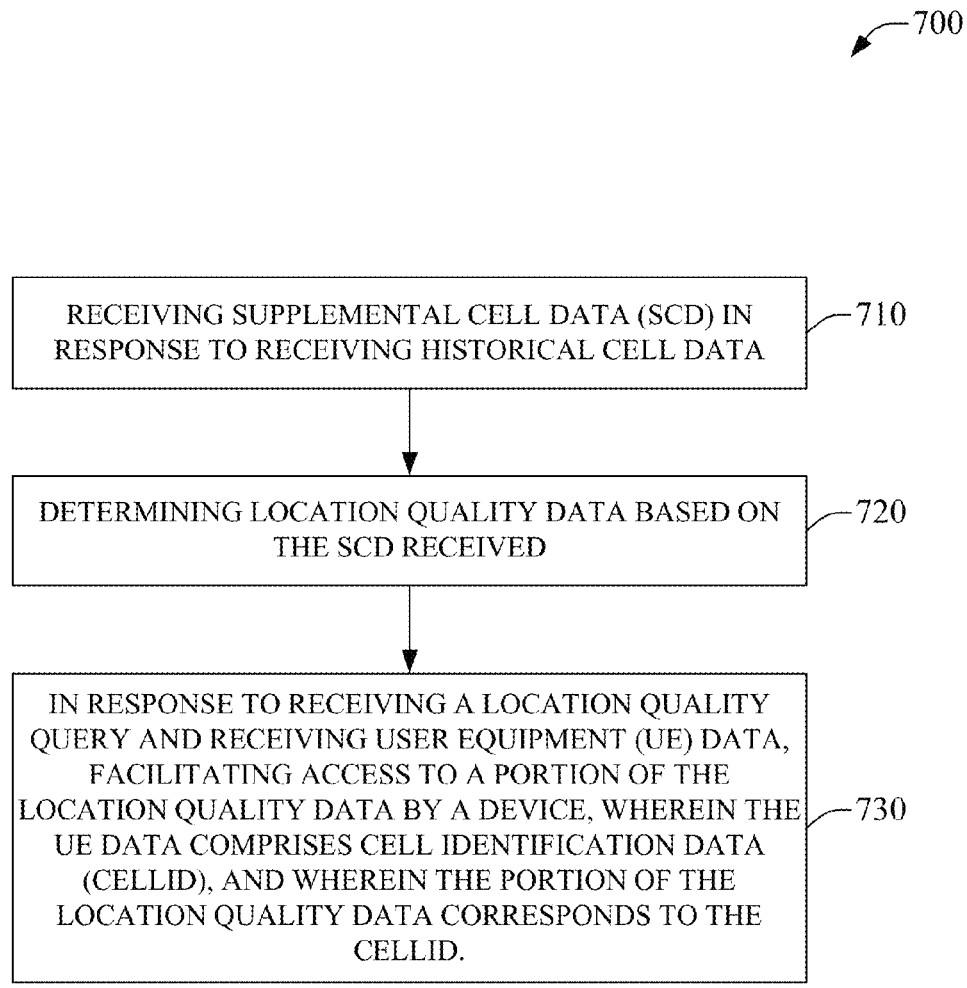
FIG. 7 illustrates an example method facilitating determining location quality data based on identification of a base station device in accordance with aspects of the subject disclosure.
Figure 8:
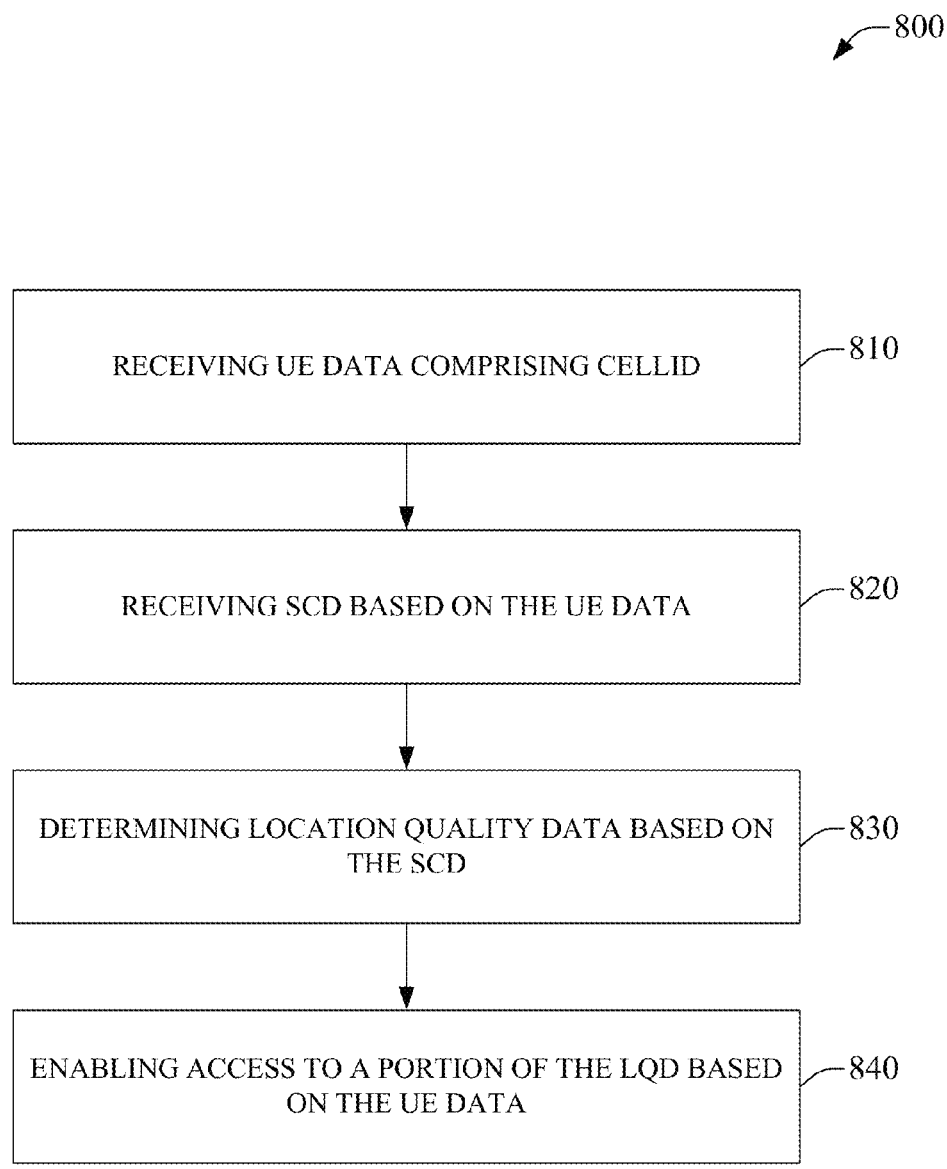
FIG. 8 illustrates an example method enabling determining location quality data based on identification of a base station device in accordance with aspects of the subject disclosure.
Figure 9:
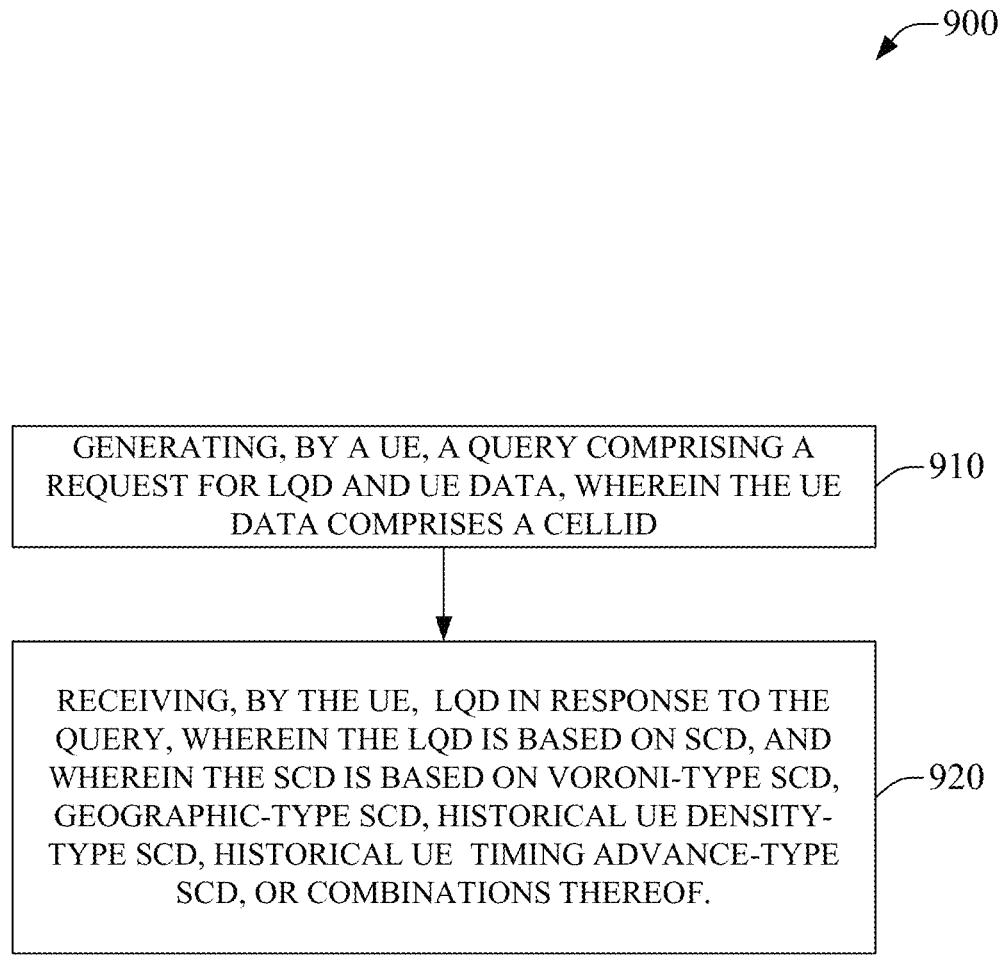
FIG. 9 illustrates an example method enabling a UE to receive location quality data, wherein the location quality data is based on identification of a base station device, in accordance with aspects of the subject disclosure.

In view of the example system(s) described above, example method(s) that can be implemented in accordance with the disclosed subject matter can be better appreciated with reference to flowcharts in FIG. 7-FIG. 9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates a method 700 that facilitates determining location quality data based on identification of a base station device in accordance with aspects of the subject disclosure. Method 700, at 710, can comprise receiving supplemental cell data (SCD) in response to receiving historical cell data. Historical cell data can comprise data related to locations of a base station (BS) and a corresponding identifier for the BS, e.g., a CellID. The location information can be based on installation records for the BS, empirical measurements in a radio network, user reported locations, CellID information, etc. Network providers can typically have much of this historical cell information in existing databases. Historical cell data can be received about a network from data stored by an entity associated with the network. As an example, a wireless network provider can, in the course of regular business, store data related to the identification, location, operations, and various parameters of BSs providing wireless access to the network, which information can be comprised in historical cell data. In an aspect, the historical cell data can represent a network of BSs, wherein the representation comprises the CellIDs, the locations of the BSs, and parameters associated with the BSs, such as, azimuth, elevation, power, coverage areas, etc., typically associated with operation of the network, e.g., determining coverage holes, coverage extents, service calls, maintenance, repair, etc.

Supplemental cell data (SCD) can comprise any combination of Voronoi-type SCD, geographic-type SCD, historical UE density-type SCD, historical UE timing advance-type SCD, etc., e.g., 142, 144, 146, 148, 242, 244, 246, 248, etc. SCD can be employed to ignore areas where a UE is less likely to be located, such that the area where the UE can be located and concurrently in the service area of an identified BS is reduced, allowing a greater degree of confidence in the reported location, e.g., a higher quality of location data that can be associated with a lower degree of error in comparison to returning a location of a device with error bounded solely by the claimed service area of the identified BS.

At 720, method 700 can comprise determining LQD based on the SCD received. The SCD and historical cell data can be employed to precompute locations and associated location error for different combination of parameters associated with the SCD and the historical cell data. As an example, where SCD is an empty data set, historical cell data can be used to determine a location that can be given for a UE that can see the BS as the location of the BS itself and, based on the coverage area of the BS, the error can be, for example, determined to be the average diameter of the coverage area, an average RMS value of the extents of the coverage area, etc. However, inclusion of SCD can dramatically improve determinations of location error. As an example, Voronoi cell data can be employed to compute an average RMS value between the location of the BS and the extents of the Voronoi cell associated therewith. Whereas the Voronoi cell can generally have a smaller area than the extents of the coverage area, the resulting average RMS distance value can be lower than that for the extents of the coverage area, resulting in less error associated with the location information and improved location quality data (LQD). The LQD for the BS can be stored for later use, e.g., via a query targeted to the BS. Similarly, precomputation based on various combinations of the SCD and historical cell data can be stored for later use. This data can be stored on one or more storage devices, which devices can be local to a component that determines LQD, remote from a component that determines LQD, or distributed among different storage devices that can be either local or remote from a component that determines LQD, such as a cloud-based storage.

At 730, method 700 can comprise facilitating access to a portion of the LQD by a device. At this point method 700 can end. The access can be facilitated in response to receiving a location quality query and receiving UE data. UE data can comprise cell identification data (CellID). The CellID can be employed to select LQD corresponding to the identified BS. As an example, a data store can store LQD data for various permutations of SCD for every BS of a wireless network provider in a determined region, e.g., a huge number of data records, and a CellID can be employed to select the LQD for a single identified BS. Moreover, the UE data can comprise UE timing advance (TA) data. The TA data can similarly be employed to select LQD corresponding to the TA data, e.g., where the TA data indicates a chip of 25, then LQD for 25 chip TA can be selected. Moreover, the TA selection can be restricted to the BS identified by the CellID, allowing rapid convergence on corresponding LQD. Moreover, the LQD can be premised on combination of Voronoi data, geographic data, historical UE density data, etc., such the LQD can comprise error metrics that can be substantially improved over conventional location technologies based on what BSs a UE can see.

FIG. 8 illustrates a method 800 that facilitates determining location quality data based on identification of a base station device in accordance with aspects of the subject disclosure. Method 800, at 810, can comprise receiving UE data comprising a CellID. A CellID can identify a determined BS, e.g., AP, NodeB, eNodeB, femtocell, picocell, etc. The CellID can indicate a specific BS in a wired or wireless network.

Method 800, at 820, can include receiving SCD based on the UE data. SCD can comprise one or more of Voronoi-type SCD, geographic-type SCD, historical UE density-type SCD, historical UE timing advance-type SCD, etc., e.g., 142, 144, 146, 148, 242, 244, 246, 248, etc. SCD can be employed to reduce the effect of low probability for a UE being located in an area in regard to determining a location error associated with a determined location of a UE based on the UE being in the coverage area of the BS, e.g., the SCD can remove from consideration or reduce a weight afforded to an area where a UE is less likely to be located. This can enable determination of location error that can be improved over error determined in the absence of SCD, for a UE determined to be located in a service area of an identified. The lower error can be associated with a higher quality of location data.

At 830, method 800 can comprise determining LQD based on the SCD. The LQD can comprise a location error metric. The LQD can be based on various permutations combining the SCD with historical cell data, e.g., a known location of the determined BS. As an example, Voronoi data can be associated with a smaller area than the extents of a service area for a particular BS. As such, 50% error value can be determined based on an average RMS value of distance between the BS location and an extent of the Voronoi cell edge, either measured continuously or at angular intervals. Moreover, the inclusion of other SCD can further improve the error associated with the location, e.g., reduce the associated error value. As an example, geographical data can remove portions of the Voronoi cell from consideration, e.g., areas where a UE is below a threshold value to be located therein, such as a lake, cemetery, large forested areas, nature preserves, rivers, etc.

At 840, method 800 can comprise enabling access to a portion of the LQD based on the UE data. At this point method 800 can end. Whereas LQD can be determined for one or more BSs, the UE data, e.g., CellID, can allow access to a portion of the LQD based on an identified BS. In an aspect, a query for a UE location can therefore be based on the UE being in a service area of a BS, e.g., the UE can see the BS. This can allow data associated with typical radio access network access to be employed in determining a location of the UE, e.g., via substitution of the BS location, substitution of a centroid location, substitution of a geographic centroid location, substitution of a weighted centroid location, etc., rather than using a more power intensive location determination technology, e.g., GPS, etc. However, conventional location determination via substitution of a BS location can often be associated with substantial error, more especially in areas where the BS has a large coverage area. By employing the disclosed technology, e.g., method 800, an location error can be reduced/improved, to allow broader use and acceptance of location determination via substitution of a BS or corresponding centroid(s). As an example, where a UE can see a BS, method 800 can enable location determination via substitution of a weighted centroid having substantially less location error than can be associated with substitution of a BS location having an error as large as the coverage area of the BS. This can allow the example UE to avoid consuming additional battery power associated with use of a GPS location technology, thereby extending battery life of the UE. Moreover, as the example UE moves through the wireless network, the location of the UE can be ascertained based on the UE handshaking with the BSs of the network, allowing queries as to the UE's location without need of any further action on the part of the UE. This can be valuable, for example, in verifying the use of a credit card, e.g., where the point of sale terminal is located in a first location, a second location of a UE associated with the credit card, such as via a user profile, can be determined based on a the UE seeing a nearby BS and, with sufficiently low error, the second can be compared to the first location to validate the use of the credit card. Where the error is large, e.g., low LQD, the second location can be insufficient to validate the transaction. As such, method 800, etc., can enable use of a low power, background enabled, location technology by reducing the location error traditionally associated with CellID location techniques.

FIG. 9 illustrates a method 900 enabling a UE to receive location quality data, wherein the location quality data is based on identification of a base station device, in accordance with aspects of the subject disclosure. Method 900, at 910, can comprise generating, by UE, a query comprising UE data and a request for LQD. In an aspect, the UE data can comprise a CellID. UE data, in some embodiments, can further comprise UEID, UE TA data, etc. The CellID can be employed to select a portion of LQD determined by another device.

At 920, method 900 can comprise, receiving, by the UE, LQD in response to the query. At this point method 900 can end. In an aspect, the LQD received at 920 can be a portion of LQD determined by another device, stored on a data storage device/network, etc. In an aspect, the LQD can be based on SCD. In some embodiments, SCD can be combined with historical cell data. SCD can comprise Voronoi-type SCD, geographic-type SCD, historical UE density-type SCD, historical UE timing advance-type SCD, etc., e.g., 142, 144, 146, 148, 242, 244, 246, 248, etc. Various combinations of SCD data can provide different location information and location error information, as disclosed herein. In some embodiments, method 900 can be performed for another device rather than a UE. In these embodiments, the other device can provide a UEID and CellID as UE data, so that the location an LQD can be associated with a particular UE for an indicated BS.

Figure 10:
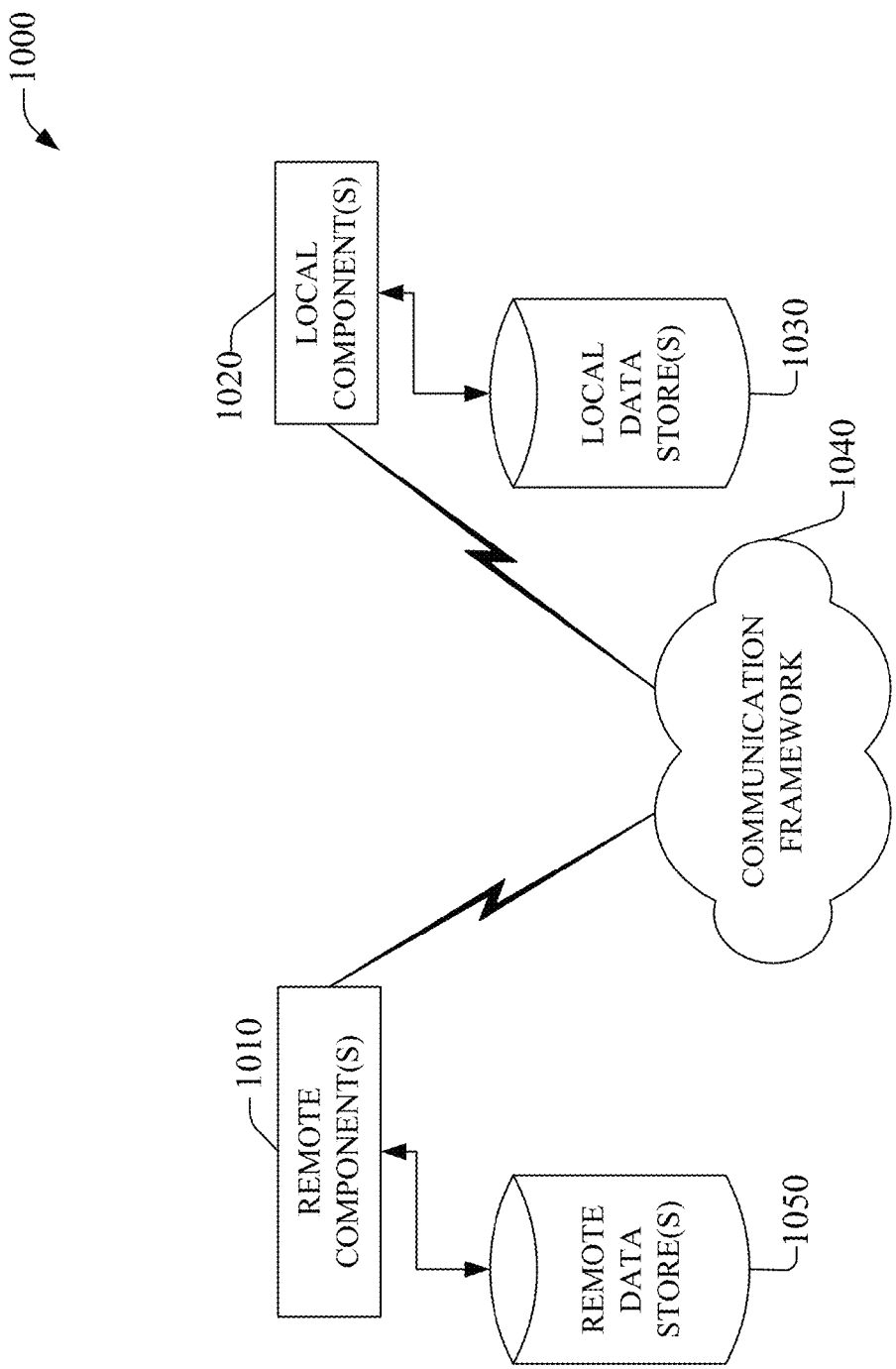
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can comprise servers, personal servers, wireless telecommunication network devices, RAN device(s), etc. As an example, remote component(s) 1010 can be a source of UEID 136, UE TA data 134, CellID 132, SCD 140, Voronoi-type SCD, geographic-type SCD, historical UE density-type SCD, historical UE timing advance-type SCD, etc., e.g., 142, 144, 146, 148, 242, 244, 246, 248, etc., historical cell data 120, etc., a data storage device, a cloud-based data store or virtualized LQC 110, etc.

The system 1000 also comprises one or more local component(s) 1020. The local component(s) 1020 can be hardware and/or software (e.g., threads, processes, computing devices). In some embodiments, local component(s) 1020 can comprise, for example, LQC 110, etc.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040. As examples, UEID 136, UE TA data 134, CellID 132, SCD 140, Voronoi-type SCD, geographic-type SCD, historical UE density-type SCD, historical UE timing advance-type SCD, etc., e.g., 142, 144, 146, 148, 242, 244, 246, 248, etc., historical cell data 120, etc., can be stored on a local data store(s) 1030 of a local component 1020.

Figure 11:
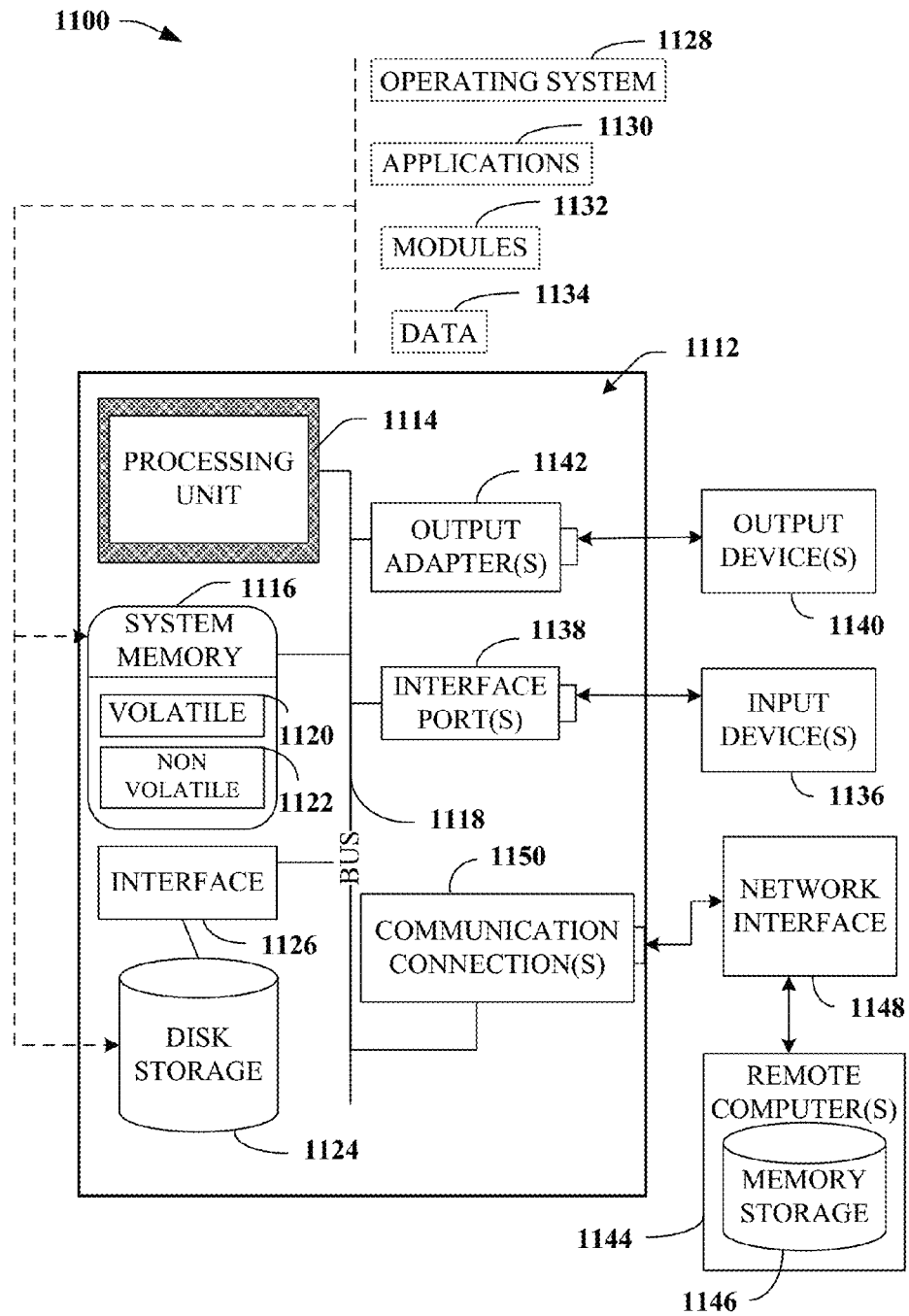
FIG. 11 illustrates an example block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, LQC 110, etc., a source of UEID 136, UE TA data 134, CellID 132, SCD 140, Voronoi-type SCD, geographic-type SCD, historical UE density-type SCD, historical UE timing advance-type SCD, etc., e.g., 142, 144, 146, 148, 242, 244, 246, 248, etc., historical cell data 120, etc., can comprise a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising determining LQD based on combinations of UEID 136, UE TA data 134, CellID 132, SCD 140, Voronoi-type SCD, geographic-type SCD, historical UE density-type SCD, historical UE timing advance-type SCD, etc., e.g., 142, 144, 146, 148, 242, 244, 246, 248, etc., historical cell data 120, etc.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial busport can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, multiple-input and multiple-output (MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   based on cell data associated with a service area of a base station device of a wireless network, determining a location error value for a first location, wherein:
   the location error value is based on an average distance between the first location and a second location associated with the cell data,
   the cell data comprises Voronoi data and geographical data comprising an exclusion area,
   the first location is a geographic centroid location based on a shape defined by a combination of a Voronoi cell represented in the Voronoi data and the exclusion area and corresponds to a known location of the base station device, and
   the second location is a location of a point on an edge of the Voronoi cell; and
   in response to a location inquiry related to the user equipment, enabling access to the location error value.

2. The system of claim 1, wherein the cell data comprises data from a group of data comprising historical user equipment density data, and historical user equipment timing advance data.

3. The system of claim 1, wherein the first location is a base station location that is substituted for a user equipment location of the user equipment in response to the location inquiry related to the user equipment.

4. The system of claim 1, wherein the first location is a weighted centroid location that is substituted for a user equipment location of the user equipment in response to the location inquiry related to the user equipment.

5. The system of claim 4, wherein the weighted centroid location is determined based on a historical density of user equipments in a portion of the service area of the base station device.

6. The system of claim 1, wherein:
   the average distance is based on a group of distances comprising a root mean square distance between the first location and the second location.

7. The system of claim 6, wherein the average distance is an average of root mean square distances for distances between the first and the second location respectively, and wherein the second location is incremented by a determined angular value.

8. The system of claim 6, wherein the average distance is an average of root mean square distances averaged over each distance between the first location and each point on the edge of the Voronoi cell, respectively.

9. The system of claim 6, wherein:
   the second location is a location of a point on the shape, and
   the average distance is based on a group of distances comprising a root mean square distance between the first location and the second location.

10. The system of claim 1, wherein:
    the cell data comprises historical user equipment density data,
    the first location is a weighted centroid location based on the shape,
    the second location is a location corresponding to a user equipment of the historical user equipment density data, and
    the average distance is an average of distances between the first location and a group of historical user equipment locations comprising the second location.

11. The system of claim 1, wherein:
    the cell data comprises historical user equipment timing advance data,
    the first location is located within an annular region associated with a distance determined from a timing advance value of the timing advance data,
    the second location is a location corresponding to a point of an edge of the annular region, and
    the average distance is based on a group of distances comprising a distance between the first location and the second location.

12. A method, comprising:
    receiving, by a system comprising a processor, cell data associated with a service area of a base station device of a wireless network,
    wherein the receiving the cell data comprises receiving Voronoi data related to a Voronoi cell boundary;
    determining, by the system, a location error value for a first location, wherein the location error value is based on an average distance between the first location and a second location associated with the cell data,
    wherein the first location is a geographic centroid location based on historical user equipment densities of historical user equipment density data for user equipments historically within the Voronoi cell boundary and corresponds to a known location of the base station device, and wherein the second location is a location of a point on the Voronoi cell boundary; and
    enabling, by the system, access to the location error value.

13. The method of claim 12, wherein the average distance is based on a group of distances comprising a root mean square distance between the first location and the second location.

14. The method of claim 13, wherein the receiving the cell data further comprises receiving geographical data comprising an exclusion area boundary,
- wherein the first location is a weighted centroid location based on a shape defined by a combination of the Voronoi cell boundary and the exclusion area boundary,
- wherein the second location is a location of a point on an edge of the shape, and
- wherein the average distance is based on a group of distances comprising a root mean square distance between the first location and the second location.

15. The method of claim 13, wherein the receiving the cell data further comprises receiving historical user equipment density data,
- wherein the second location is a location corresponding to a user equipment of the user equipment density data, and
- wherein the average distance is an average of distances between the first location and a group of historical user equipment locations comprising the second location.

16. The method of claim 13, wherein the user equipments are first user equipments, wherein the receiving the cell data further comprises receiving historical user equipment timing advance data, wherein the first location is a weighted centroid location based on historical user equipment densities of the historical user equipment density data for second user equipments historically located within a portion of an annular region associated with a distance determined from a timing advance value of the timing advance data, and wherein the portion of the annular region is also within the Voronoi cell boundary.

17. The method of claim 13, wherein:
- the receiving the cell data further comprises receiving historical user equipment timing advance data,
- the first location is located within a portion of an annular region associated with a distance determined from a timing advance value of the timing advance data,
- the portion of the annular region is also within the Voronoi cell boundary,
- the second location is a location corresponding to a point of an edge of the annular region, and
- the average distance is based on a group of distances comprising a distance between the first location and the second location.

18. A device, comprising:
a processor; and
a memory that stores executable instructions that, when executed by the processor, facilitate performance of operations, comprising:
- querying for a location of a user equipment associated with an identifier value of a base station device; and
- in response to the querying, receiving a location error value corresponding to a location of the user equipment in a service area of the base station device corresponding to the identifier value, wherein:
  - the location error value is determined for a first location within the service area,
  - the first location is a weighted centroid location based on a shape determined from historical user equipment density data and corresponds to a location of the base station device,
  - the location error value is determined based on cell data associated with the service area,
  - the cell data comprises Voronoi data related to a Voronoi cell boundary,
  - the location error value corresponds to an average distance between the first location and a second location associated with the cell data, and
  - the second location is a location of a point on the Voronoi cell boundary that corresponds to a historical location of a user equipment from the historical user equipment density data.

19. The device of claim 18, wherein the average distance is an average of a group of distances comprising a root mean square distance between the first location and the second location.

20. The device of claim 18, wherein:
the cell data comprises the historical user equipment density data,
and the average distance is an average of distances between the first location and a group of historical user equipment locations comprising the second location.

* * * * *